(12) United States Patent
Einhaus et al.

(10) Patent No.: US 10,686,642 B2
(45) Date of Patent: *Jun. 16, 2020

(54) MCS TABLE ADAPTION FOR 256-QAM

(71) Applicant: Sun Patent Trust, New York, NY (US)

(72) Inventors: Michael Einhaus, Langen (DE); Alexander Golitschek Edler von Elbwart, Langen (DE); Joachim Loehr, Langen (DE); Masayuki Hoshino, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,694

(22) Filed: Mar. 14, 2019

(65) Prior Publication Data
US 2019/0215221 A1    Jul. 11, 2019

Related U.S. Application Data

(63) Continuation of application No. 14/781,887, filed as application No. PCT/EP2014/056466 on Mar. 31, 2014, now Pat. No. 10,277,447.

(30) Foreign Application Priority Data

Apr. 5, 2013  (EP) .................................. 13162594

(51) Int. Cl.
*H04L 27/00* (2006.01)
*H04L 27/34* (2006.01)
(Continued)

(52) U.S. Cl.
CPC ............ *H04L 27/34* (2013.01); *H04L 1/0003* (2013.01); *H04L 1/0016* (2013.01);
(Continued)

(58) Field of Classification Search
CPC ............ H04W 52/365; H04W 72/1278; H04L 1/0003
(Continued)

(56) References Cited

U.S. PATENT DOCUMENTS 8,509,168 B2    8/2013  Kim et al.
9,407,417 B2    8/2016  Chen et al.
(Continued)

FOREIGN PATENT DOCUMENTS

CN      102624481 A     8/2012
EP      1 903 691 A1    3/2008
(Continued)

OTHER PUBLICATIONS

3GPP TS 36 213 VI 0.0.1 3rd Generation Project Technical Specification Group Radio Access Network; Evolved Universal Terrestrial Radio Access (E-UTRA); Physical Layer procedures (Release 10) (Dec. 2010) (Year: 2010).*
(Continued)

*Primary Examiner* — Asad M Nawaz
*Assistant Examiner* — Jason A Harley
(74) *Attorney, Agent, or Firm* — Seed IP Law Group LLP

(57) ABSTRACT

The present disclosure relates to adaptive modulation and coding scheme selection and signaling in a communication system. In particular, a modulation and coding scheme to be used for transmission of a data is selected from a set of predetermined modulation and coding schemes. The predetermination of the set is performed by selecting the set from a plurality of predefined sets. The sets have the same size, so that a modulation and coding selection indicator signaled to select the modulation and coding scheme may be advantageously applied to any of the selected sets. Moreover, a second set includes schemes with a modulation not covered
(Continued)

by the schemes of a first set, and which is of a higher order than any modulation in the first set.

8 Claims, 15 Drawing Sheets

(51) Int. Cl.
*H04W 28/02* (2009.01)
*H04W 72/04* (2009.01)
*H04L 1/00* (2006.01)
*H04W 72/12* (2009.01)

(52) U.S. Cl.
CPC ....... *H04L 1/0029* (2013.01); *H04W 72/1263* (2013.01); *H04W 72/1278* (2013.01); *H04L 1/0028* (2013.01)

(58) Field of Classification Search
USPC ......................................................... 370/329
See application file for complete search history.

(56) References Cited

U.S. PATENT DOCUMENTS

| | | | |
|---|---|---|---|
| 9,419,772 | B2 | 8/2016 | Kim et al. |
| 9,544,880 | B2 | 1/2017 | Song et al. |
| 9,642,118 | B2 | 5/2017 | Lahetkangas et al. |
| 2007/0121547 | A1 | 5/2007 | Huh et al. |
| 2009/0010211 | A1 | 1/2009 | Sumasu et al. |
| 2009/0141648 | A1 | 6/2009 | Imamura et al. |
| 2010/0208665 | A1* | 8/2010 | Vivanco ............... H04L 1/0025 370/329 |
| 2011/0044278 | A1* | 2/2011 | Astely ................. H04L 1/1621 370/329 |
| 2011/0235604 | A1 | 9/2011 | Inoue et al. |
| 2011/0268043 | A1* | 11/2011 | Golitschek Edler Von Elbwart ............... H04L 1/0026 370/329 |
| 2012/0008517 | A1 | 1/2012 | Imamura et al. |
| 2012/0250541 | A1* | 10/2012 | Ko ....................... H04L 1/0026 370/252 |
| 2014/0313985 | A1* | 10/2014 | Nimbalker ......... H04L 27/0012 370/329 |
| 2015/0036590 | A1 | 2/2015 | Lahetkangas et al. |
| 2015/0200746 | A1 | 7/2015 | Pan et al. |
| 2016/0057735 | A1 | 2/2016 | Liu et al. |
| 2016/0344511 | A1* | 11/2016 | Srinivasa ............... H04L 27/34 |

FOREIGN PATENT DOCUMENTS

| | | |
|---|---|---|
| JP | 2006/217173 A | 8/2006 |
| JP | 2015-513834 A | 5/2015 |
| WO | 2007/020994 A1 | 2/2007 |
| WO | 2010/061825 A1 | 6/2010 |
| WO | 2013/123961 A1 | 8/2013 |

OTHER PUBLICATIONS

3GPP TS 36.211 V10.0.0, "3rd Generation Partnership Project; Technical Specification Group Radio Access Network; Evolved Universal Terrestrial Radio Access (E-UTRA); Physical channels and modulation (Release 10)," Dec. 2010, 103 pages.
3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.
3GPP TS 36.212 V10.0.0, "3rd Generation Partnership Project; Technical Specification Group Radio Access Network; Evolved Universal Terrestrial Radio Access (E-UTRA); Multiplexing and channel coding (Release 10)," Dec. 2010, 72 pages.
3GPP TS 36.212 V11.1.0, "3rd Generation Partnership Project; Technical Specification Group Radio Access Network; Evolved Universal Terrestrial Radio Access (E-UTRA); Multiplexing and channel coding (Release 11)," Dec. 2012, 82 pages.
3GPP TS 36.213 V10.0.1, "$3^{rd}$ Generation Partnership Project; Technical Specification Group Radio Access Network; Evolved Universal Terrestrial Radio Access (E-UTRA); Physical layer procedures (Release 10)," Dec. 2010, 98 pages.
3GPP TS 36.213 V11.1.0, "$3^{rd}$ Generation Partnership Project; Technical Specification Group Radio Access Network; Evolved Universal Terrestrial Radio Access (E-UTRA); Physical layer procedures (Release 11)," Feb. 2012, 160 pages.
3GPP TS 36.213 V11.2.0, "$3^{rd}$ Generation Partnership Project; Technical Specification Group Radio Access Network; Evolved Universal Terrestrial Radio Access (E-UTRA); Physical layer procedures (Release 11)," Feb. 2013, 173 pages.
Extended European Search report dated Sep. 16, 2013, for corresponding EP Application No. 13 16 2594, 8 pages.
HTC, "On Small Cell Enhancement for Improved Spectral Efficiency", R1-130311, 3GPP TSG WG1 Meeting #72, Agenda item: 7.3.5.2, St Julian's, Malta, Jan. 28-Feb. 1, 2013, 4 pages.
International Search Report dated Jul. 30, 2014, for corresponding International Application No. PCT/EP2014/056466, 3 pages.
Notice of Reasons for Rejection, dated Dec. 12, 2017, corresponding to Japanese Patent Application No. 2016-505787, 9 pages. (English Translation).
English Translation for Chinese Office Action, dated Nov. 16, 2017, for corresponding Chinese Application No. 201480024851.8, 8 pages.
Sesia et al., "LTE—The UMTS Long Term Evolution from Theory to Practice," Section 9.3.2.3, 6 pages.
Ericsson, ST-Ericsson, "Overview of Candidate Spectrum Efficiency Improvements," R1-130564, Agenda Item: 7.3.5.2, 3GPP TSG RAN WG1 Meeting #72, St. Julian's, Malta, Jan. 28-Feb. 1, 2013, 3 pages.
Fujitsu, "Evaluation assumptions for introduction of DL higher order modulation to small cell," R1-130172, Agenda Item 7.3.5.2, 3GPP TSG RAN WG1 Meeting #72, St. Julian's, Malta, Jan. 28-Feb. 1, 2013, 6 pages.
Qualcomm Incorporated, "Higher order modulation for small cells," R1-130593, Agenda Item: 7.3.5.2, 3GPP TSG RAN WG1 Meeting #72, St. Julian's, Malta, Jan. 28-Feb. 1, 2013, 5 pages.
ZTE, "Consideration on high order modulation for small cell," R1-130136, Agenda Item 7.3.5.2, 3GPP TSG RAN WG1 Meeting #72, St. Julian's, Malta, Jan. 28-Feb. 1, 2013, 6 pages.

* cited by examiner

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 15 |
| 18 | 4 | 16 |
| 19 | 4 | 17 |
| 20 | 4 | 18 |
| 21 | 4 | 19 |
| 22 | 4 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Fig. 6

| MCS Index | Modulation Order | TBS Index |
|---|---|---|
| 0 | 8 | 26 |
| 1 | 8 | 27 |
| 2 | 8 | 28 |
| 3 | 8 | 29 |
| 4 | 8 | 30 |
| 5 | 8 | 31 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 15 |
| 18 | 4 | 16 |
| 19 | 4 | 17 |
| 20 | 4 | 18 |
| 21 | 4 | 19 |
| 22 | 4 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Fig. 10A

| MCS Index | Modulation Order | TBS Index |
|---|---|---|
| 0 | 8 | 26 |
| 1 | 8 | 27 |
| 2 | 8 | 28 |
| 3 | 8 | 29 |
| 4 | 8 | 30 |
| 5 | 8 | 31 |
| 6 | 8 | 32 |
| 7 | 8 | 33 |
| 8 | 8 | 34 |
| 9 | 8 | 35 |
| 10 | 8 | 36 |
| 11 | 8 | 37 |
| 12 | 8 | 38 |
| 13 | 8 | 39 |
| 14 | 8 | 40 |
| 15 | 8 | 41 |
| 16 | 8 | 42 |
| 17 | 8 | 43 |
| 18 | 4 | 16 |
| 19 | 4 | 17 |
| 20 | 4 | 18 |
| 21 | 4 | 19 |
| 22 | 4 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

Fig. 10B

| MCS Index | Modulation Order | TBS Index |
|---|---|---|
| 0 | 2 | 0 |
| 1 | 2 | 1 |
| 2 | 8 | 26 |
| 3 | 8 | 27 |
| 4 | 8 | 28 |
| 5 | 8 | 29 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 15 |
| 18 | 4 | 16 |
| 19 | 4 | 17 |
| 20 | 4 | 18 |
| 21 | 4 | 19 |
| 22 | 4 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | |
| 30 | 4 | reserved |
| 31 | 6 | |

Fig. 13A

| MCS Index | Modulation Order | TBS Index |
|---|---|---|
| 0 | 2 | 0 |
| 1 | 2 | 1 |
| 2 | 8 | 26 |
| 3 | 8 | 27 |
| 4 | 8 | 28 |
| 5 | 8 | 29 |
| 6 | 8 | 30 |
| 7 | 8 | 31 |
| 8 | 8 | 32 |
| 9 | 8 | 33 |
| 10 | 8 | 34 |
| 11 | 8 | 35 |
| 12 | 8 | 36 |
| 13 | 8 | 37 |
| 14 | 8 | 38 |
| 15 | 8 | 39 |
| 16 | 8 | 40 |
| 17 | 8 | 41 |
| 18 | 4 | 16 |
| 19 | 4 | 17 |
| 20 | 4 | 18 |
| 21 | 4 | 19 |
| 22 | 4 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | |
| 30 | 4 | Reserved |
| 31 | 6 | |

Fig. 13B

| MCS Index | Modulation Order | TBS Index |
|---|---|---|
| 0 | 8 | reserved |
| 1 | 8 | 26 |
| 2 | 8 | 27 |
| 3 | 8 | 28 |
| 4 | 8 | 29 |
| 5 | 8 | 30 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 15 |
| 18 | 4 | 16 |
| 19 | 4 | 17 |
| 20 | 4 | 18 |
| 21 | 4 | 19 |
| 22 | 4 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | reserved |

Fig. 16A

| MCS Index | Modulation Order | TBS Index |
|---|---|---|
| 0 | 8 | reserved |
| 1 | 8 | 26 |
| 2 | 8 | 27 |
| 3 | 8 | 28 |
| 4 | 8 | 29 |
| 5 | 8 | 30 |
| 6 | 8 | 31 |
| 7 | 8 | 32 |
| 8 | 8 | 33 |
| 9 | 8 | 34 |
| 10 | 8 | 35 |
| 11 | 8 | 36 |
| 12 | 8 | 37 |
| 13 | 8 | 38 |
| 14 | 8 | 39 |
| 15 | 8 | 40 |
| 16 | 8 | 41 |
| 17 | 8 | 42 |
| 18 | 4 | 16 |
| 19 | 4 | 17 |
| 20 | 4 | 18 |
| 21 | 4 | 19 |
| 22 | 4 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | Reserved |
| 31 | 6 | Reserved |

Fig. 16B

MCS TABLE ADAPTION FOR 256-QAM

BACKGROUND

Technical Field

The disclosure relates to methods for transmitting and receiving data in a multicarrier communication system and, in particular, to adaptive modulation and coding signaling. The disclosure is also providing the mobile terminal and the base station apparatus for performing the methods described herein.

Description of the Related Art

Third generation (3G) mobile radio systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The downlink will support data modulation schemes QPSK, 16-QAM, and 64-QAM and the uplink will support QPSK, 16QAM, and at least for some devices also 64-QAM, for physical data channel transmissions. The term "downlink" denotes direction from the network to the terminal. The term "uplink" denotes direction from the terminal to the network.

LTE's network access is to be extremely flexible, using a number of defined channel bandwidths between 1.4 and 20 MHz, compared with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

The overall architecture of an LTE network is shown in FIG. 1 and a more detailed representation of the E-UTRAN architecture is given in FIG. 2.

As can be seen in FIG. 1, the LTE architecture supports interconnection of different radio access networks (RAN) such as UTRAN or GERAN (GSM EDGE Radio Access Network), which are connected to the EPC via the Serving GPRS Support Node (SGSN). In a 3GPP mobile network, the mobile terminal 110 (called User Equipment, UE, or device) is attached to the access network via the Node B (NB) in the UTRAN and via the evolved Node B (eNB) in the E-UTRAN access. The NB and eNB 120 entities are known as base station in other mobile networks. There are two data packet gateways located in the EPS for supporting the UE mobility—Serving Gateway (SGW) 130 and Packet Data Network Gateway 160 (PDN-GW or shortly PGW). Assuming the E-UTRAN access, the eNB entity 120 may be connected through wired lines to one or more SGWs via the S1-U interface ("U" stays for "user plane") and to the Mobility Management Entity 140 (MME) via the S1-MMME interface. The SGSN 150 and MME 140 are also referred to as serving core network (CN) nodes.

As anticipated above and as depicted in FIG. 2, the E-UTRAN consists of eNodeB 120, providing the E-UTRA user plane (PDCP/RLC/MAC/PHY) and control plane (RRC) protocol terminations towards the user equipment (UE). The eNodeB 120 hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs 120 are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMES/Serving Gateways and eNodeBs 120. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME 140 is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

FIGS. 3 and 4 illustrate the structure of a component carrier in the LTE release 8. The downlink component carrier of a 3GPP LTE Release 8 is subdivided in the time-frequency domain in so-called subframes, each of which is divided into two downlink slots as shown in FIG. 3. A downlink slot corresponding to a time period $T_{slot}$ is shown in detail in FIGS. 3 and 4 with the reference numeral 320. The first downlink slot of a subframe comprises a control channel region (PDCCH region) within the first OFDM symbol(s). Each subframe consists of a give number of OFDM symbols in the time domain (12 or 14 OFDM symbols in 3GPP LTE (Release 8)), wherein each OFDM symbol spans over the entire bandwidth of the component carrier.

In particular, the smallest unit of resources that can be assigned by a scheduler is a resource block also called physical resource block (PRB). With reference to FIG. 4, a PRB 330 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the subframe in the time domain. $N_{symb}^{DL}$ may be either 6 or 7 resulting in either 12 or 14 OFDM symbols in total. Consequently, a physical resource block 330 consists of $N_{symb}^{DL} \times N_{sc}^{RB}$ resource elements corresponding to one slot in the time domain and 180 kHz in the frequency domain (further details on the downlink resource grid can be found, for example, in 3GPP TS 36.211, "Evolved universal terrestrial radio access (E-UTRA); physical channels and modulations (Release 10)", version 10.4.0, 2012, Section 6.2, freely available at www.3gpp.org, which is incorporated herein by reference). While it can happen that some resource elements within a resource block or resource block pair are not used even though it has been scheduled, for simplicity of the used terminology still the whole resource block or resource block pair is assigned. Examples for resource elements that are actually not assigned by a scheduler include reference signals, broadcast signals, synchronization signals, and resource elements used for various control signal or channel transmissions.

The number of physical resource blocks $N_{RB}^{DL}$ in downlink depends on the downlink transmission bandwidth configured in the cell and is at present defined in LTE as being from the interval of 6 to 110 (P)RBs. It is common practice in LTE to denote the bandwidth either in units of Hz (e.g., 10 MHz) or in units of resource blocks, e.g., for the downlink case the cell bandwidth can equivalently expressed as, e.g., 10 MHz or $N_{RB}^{DL}=50RB$.

A channel resource may be defined as a "resource block" as exemplary illustrated in FIG. 3 where a multi-carrier communication system, e.g., employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g., time slot, subframe, frame, etc., for time division multiplex (TDM)), frequency (e.g., sub-band, carrier frequency, etc., for frequency division multiplex (FDM)), code (e.g., spreading code for code division multiplex (CDM)), antenna (e.g., Multiple Input Multiple Output (MIMO)), etc., depending on the access scheme used in the mobile communication system.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink: Localized Virtual Resource Block (LVRB) and Distributed Virtual Resource Block (DVRB). In the localized transmission mode using the localized VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 the downlink control signaling is basically carried by the following three physical channels:

Physical control format indicator channel (PCFICH) for indicating the number of OFDM symbols used for control signaling in a subframe (i.e., the size of the control channel region);

Physical hybrid ARQ indicator channel (PHICH) for carrying the downlink ACK/NACK associated with uplink data transmission; and Physical downlink control channel (PDCCH) for carrying downlink scheduling assignments and uplink scheduling assignments.

The PCFICH is sent from a known position within the control signaling region of a downlink subframe using a known pre-defined modulation and coding scheme. The user equipment decodes the PCFICH in order to obtain information about a size of the control signaling region in a subframe, for instance, the number of OFDM symbols. If the user equipment (UE) is unable to decode the PCFICH or if it obtains an erroneous PCFICH value, it will not be able to correctly decode the L1/L2 control signaling (PDCCH) comprised in the control signaling region, which may result in losing all resource assignments contained therein.

The PDCCH carries control information, such as, for instance, scheduling grants for allocating resources for downlink or uplink data transmission. The PDCCH for the user equipment is transmitted on the first of either one, two or three OFDM symbols according to PCFICH within a subframe.

Physical downlink shared channel (PDSCH) is used to transport user data. PDSCH is mapped to the remaining OFDM symbols within one subframe after PDCCH. The PDSCH resources allocated for one UE are in the units of resource block for each subframe.

Physical uplink shared channel (PUSCH) carries user data. Physical Uplink Control Channel (PUCCH) carries signaling in the uplink direction such as scheduling requests, HARQ positive and negative acknowledgements in response to data packets on PDSCH, and channel state information (CSI).

The frequency spectrum for IMT-Advanced was decided at the World Radio-communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality. In carrier aggregation, two or more component carriers (component carriers) are aggregated in order to support wider transmission bandwidths up to 100 MHz. The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources. Several cells in the LTE system are aggregated into one wider channel in the LTE-Advanced system which is wide enough for 100 MHz even though these cells in LTE are in different frequency bands. All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g., barring) may be used to avoid Rel-8/9 user equipments to camp on a component carrier. A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

The CSI is reported for every component carrier, and, depending on the reporting mode and bandwidth, for different sets of subbands of the component carrier. A channel resource may be defined as a "resource block" as exemplary illustrated in FIG. 4 where a multi-carrier communication system, e.g., employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g., time slot, subframe, frame, etc., for time division multiplex (TDM)), frequency (e.g., subband, carrier frequency, etc., for frequency division multiplex (FDM)), code (e.g., spreading code for code division multiplex (CDM)), antenna (e.g., Multiple Input Multiple Output (MIMO)), etc., depending on the access scheme used in the mobile communication system.

Assuming that the smallest assignable resource unit is a resource block, in the ideal case channel quality information for each and all resource blocks and each and all users should be always available. However, due to constrained capacity of the feedback channel this is most likely not feasible or even impossible. Therefore, reduction or compression techniques are required so as to reduce the channel quality feedback signaling overhead, e.g., by transmitting channel quality information only for a subset of resource blocks for a given user.

In 3GPP LTE, the smallest unit for which channel quality is reported is called a subband, which consists of multiple frequency-adjacent resource blocks.

Accordingly, the resource grants are transmitted from the eNodeB to the UE in downlink control information (DCI) via PDCCH. The downlink control information may be transmitted in different formats, depending on the signaling information necessary. In general, the DCI may include:

a resource block assignment (RBA), and a modulation and coding scheme (MCS).

The DCI may include further information, depending on the signaling information necessary, as also described in Section 9.3.2.3 of the book "LTE: The UMTS Long Term Evolution from theory to practice" by S. Sesia, I. Toufik, M. Baker, April 2009, John Wiley & Sons, ISBN 978-0-470-69716-0, which is incorporated herein by reference. For instance, the DCI may further include HARQ related information such as redundancy version (RV), HARQ process number, or new data indicator (NDI); MIMO related information such as pre-coding; power control related information, etc. Other channel quality elements may be the Precoding Matrix Indicator (PMI) and the Rank Indicator (RI). Details about the involved reporting and transmission mechanisms are given in the following specifications to which it is referred for further reading (all documents available at http://www.3gpp.org and incorporated herein by reference):

3GPP TS 36.211, "Evolved Universal Terrestrial Radio Access (E-UTRA); Physical channels and modulation", version 10.0.0, particularly sections 6.3.3, 6.3.4, 3GPP TS 36.212, "Evolved Universal Terrestrial Radio Access (E-UTRA); Multiplexing and channel coding", version 10.0.0, particularly sections 5.2.2, 5.2.4, 5.3.3, 3GPP TS 36.213, "Evolved Universal Terrestrial Radio Access (E-UTRA); Physical layer procedures", version 10.0.1, particularly sections 7.1.7, and 7.2.

The resource block assignment specifies the physical resource blocks which are to be used for the transmission in uplink or downlink.

The modulation and coding scheme defines the modulation scheme employed for the transmission such as QPSK, 16-QAM or 64-QAM. The lower the order of the modulation, the more robust is the transmission. Thus, higher-order modulations, such as 64-QAM, are typically used when the channel conditions are good. The modulation and coding scheme also defines a code rate for a given modulation, i.e., the number of information bits carried in a predefined resource. The code rate is chosen depending on the radio link conditions: a lower code rate can be used in poor channel conditions and a higher code rate can be used in the case of good channel conditions. "Good" and "bad" here is used in terms of the signal to noise and interference ratio (SINR). The finer adaptation of the code rate is achieved by puncturing or repetition of the generic rate depending on the error correcting coder type.

FIG. 6 shows an example of an MCS table used in LTE release 11 to determine the modulation order ($Q_m$) used in the physical downlink shared channel. The levels between 0 and 9 in downlink usually represent employing of the robust QPSK modulation. In uplink, LTE release 11 foresees an MCS table which essentially has the same structure of the MCS table for the downlink channel. In downlink the QPSK modulation scheme is represented by the MCS levels between 0 and 9 (for more details refer to 3GPP TS 36.213, "Evolved Universal Terrestrial Radio Access (E-UTRA); Physical layer procedures", version 11.1.0, sections 7 and 8, respectively and in particular Tables 7.1.7.1-1 for downlink and 8.6.1-1 for uplink). The remaining levels specify configurations with higher-level modulation schemes. The levels in the MCS table corresponding to the higher indexes (17 to 28) represent the 64-QAM modulation scheme. The QPSK and 16-QAM modulation schemes are also indicated as low-order modulation schemes when compared to the 64-QAM modulation scheme. In general, the term "lower-order modulation scheme" is to be understood as any modulation order lower than the highest supported modulation order.

The first column of the MCS table defines an index which is actually signaled, for instance in the DCI, in order to provide a setting for modulation and coding scheme. The second column of the MCS table provides the order of the modulation associated with the index, according to which order 2 means QPSK, order 4 means 16-QAM and order 6 means 64-QAM. The third column of the table includes transport block size index which refers to predefined sizes of transport blocks and thus also to a coding rate (amount of redundancy added to the data). The transport block size (TBS) index in the third column of the MCS table refers to a TBS table (cf. for instance, Table 7.1.7.2.1-1 in the 3GPP TS 36.213, cited above), which includes rows with a first column corresponding to the number of the TBS index and the following columns specifying the transport block sizes for the respective numbers of resource blocks, which are signaled in the DCI and in particular in the resource block allocation (RBA) part thereof.

Transport block is a data unit which includes data to be transmitted and which are provided for the transmission by the higher layers, i.e., mapped onto the physical resources in accordance with the control information including scheduling information and/or according to the settings by the higher layers. Transport blocks are mapped on the respective resource blocks, i.e., in general onto fixed-size time slots (time domain portions).

In the coming years, operators will begin deploying a new network architecture termed Heterogeneous Networks (HetNet). A typical HetNet deployment as currently discussed within 3GPP consists of macro and pico cells. Pico cells are formed by low power eNBs that may be advantageously placed at traffic hotspots in order to offload traffic from macro cells. Macro and pico eNBs implement the scheduling independently from each other. The mix of high power macro cells and low power pico cells can provide additional capacity and improved coverage.

Generally a terminal, such as a user equipment (UE), connects to the node with the strongest downlink signal. In FIG. 5A, the area surrounding the low power eNBs and delimited by a solid line edge is the area where the downlink signal of the low power eNB is the strongest. User equipments within this area will connect to the appropriate low power eNB.

In order to expand the uptake area of a low power eNB without increasing its transmission power an offset is added to the received downlink signal strength in the cell-selection mechanism. In this manner the low power eNB can cover a larger uptake area or in other words the Pico Cells are provided with cell rage expansion (CRE). CRE is a means to increase the throughput performance in such deployments. A UE connects to a macro eNB only if the received power is at least G dB larger than the received power from the strongest pico eNB, where G is the semi-statically configured CRE bias. Typical values are expected to range from 0 to 20 dB.

FIG. 5A illustrates such a HetNet scenario where various pico cells are provided in the area of one macro cell. The range expansion zone (CRE) is delimited in FIG. 5A by a dashed edge. The pico cell edge without CRE is delimited by a solid line edge. Various UEs are shown located in the various cells. FIG. 5B schematically illustrates the concept of a HetNet scenario including a macro eNB and a plurality of pico eNB serving respectively a plurality of UEs located in their coverage areas.

A heterogeneous deployment with a range expansion in the range of 3 to 4 dB has been already considered in the LTE release 8. Nevertheless, the applicability of CRE with cell selection offsets of up to 9 dB have currently being considered at RAN1. However, the additional capacity provided by the smaller cells may be lost due to signal interference experienced by the UEs in the pico cells. The macro eNB is the single dominant interferer for pico UEs, i.e., for UEs being connected to the pico eNB. This is especially true for pico UEs at the cell edge when using CRE.

Cell-edge users served by a pico eNodeB usually have relatively low received signal strength, especially if they are located at the border of a pico cell with CRE and suffer from strong intercell interference. The major interferer is the eNodeB serving the macro cell in the Heterogeneous Network, which usually transmits subframes at a high transmission power.

In order to improve the throughput performance of cell-edge mobile terminals, the interference impact has to be reduced on the resource on which these mobile terminals are scheduled for downlink transmission. The objective of Inter-Cell Interference Coordination (ICIC) is to maximize the multi-cell throughput subject to power constraints, inter-cell signaling limitations, fairness objectives and minimum bit rate requirements.

FIG. 7 shows an exemplary downlink transmission scenario in which two UEs are served by an eNB. Depending on the SINR level on transmission resources, high or low order modulation schemes can be used for data transmissions. The set of currently supported modulation schemes in LTE consists of QPSK, 16-QAM and 64-QAM.

The modulation and coding scheme (MCS) that is used for transmissions of physical downlink shared channels (PDSCH) transmissions is indicated by the MCS field within the downlink control information (DCI). The current Rel-11 MCS field has a fixed length of five bits. This results in 32 code points that are used for indicating 32 combinations of modulation scheme and code rate of the channel coder. The code rate is determined by the transport block size that is mapped onto a set of allocated resource blocks (RBs).

The interpretation of the MCS field code points is given by the specified MCS table. The table maps each code points described as MCS index to a combination of modulation order and transport block size (TBS) index. The modulation order describes the number of bits that are mapped onto a single modulation symbol. The current Release-11 table supports modulation order 2, 4 and 6 which corresponds to QPSK, 16-QAM and 64-QAM. The TBS index is linked to an entry of the TBS table which contains a transport block size depending in the number of allocated RBs. Each TBS index corresponds therefore a certain spectral efficiency in terms of bits transmitted per RB.

The current Release-11 MCS table is shown in FIG. 6. It can be seen that the table contains three entries without TBS index. These MCS indices are used for retransmissions of erroneous transport blocks. The indication of the transport block size is not required in this case since the size is known from the initial transmission. Each MCS index corresponds to a certain SINR level at which the combination of modulation scheme and code rate that is determined by the transport block size can be used without exceeding a certain block error probability. Assuming a block error probability of 0.1, the current Release-11 table approximately covers the SINR range between −7 dB and 20 dB; the MCS table supports 27 TBS indices, and increasing the TBS index by one corresponds approximately to an SINR level difference of 1 dB.

FIG. 8 shows the RB SINR level distributions of two typical UE within a heterogeneous network deployment as evaluated during performance studies for Release-11. The results have been achieved by means of system level distributions and the curves correspond to a cell-center UE with very high average SINR level and a cell-edge UE with very low average SINR level. From FIG. 8 it can be seen that a large fraction of SINR samples of the cell-center UE is not covered by the current Rel-11 MCS table.

BRIEF SUMMARY

In view of the above mentioned problems with the prior art, the aim of the present disclosure is to provide an efficient and robust approach for covering, with the modulation and coding schemes of the adaptive modulation and coding, higher SINR conditions.

This is achieved by the features of the independent claims. Advantageous embodiments of the present disclosure are subject matter of the dependent claims.

It is the particular approach of the present disclosure to provide modulation and coding schemes subdivided into two sets, one of which covers the lower spectral efficiencies and is advantageously applicable for lower SINR levels and the other covering the higher spectral efficiencies which is advantageously applicable to higher SINR levels. These sets have the same length in order to be addressable by the same modulation and coding scheme indicator. The sets differ by the entries of the highest-order modulation. The transmitter and the receiver are able to select between the two (or more) sets.

According to an aspect of the present disclosure, an apparatus is provided for receiving data from a network node in a communications system, the apparatus comprising a control information reception unit for receiving scheduling information specifying resources on which data are to be transmitted and including a modulation and coding indicator; a modulation and coding selection unit capable of selecting modulation and coding from a set of predefined modulation and coding schemes according to the modulation and coding indicator, a set selection unit for selecting the set of predefined modulation and coding schemes from at least two predefined sets—the first set and the second set, which have a plurality of modulation and coding schemes in common and differ in that the second set further includes an additional modulation with an order higher than any modulation in the first set, and the first set and the second set have the same size; and a data transmission unit for transmitting the data on the scheduled resources using the selected modulation and coding.

According to another aspect of the present disclosure, an apparatus is provided for transmitting data in a communications system, the apparatus comprising: a control information transmission unit for transmitting scheduling information specifying resources on which the data are to be transmitted and including a modulation and coding indicator; a modulation and coding selection unit capable of selecting modulation and coding from a set of predefined modulation and coding schemes according to the modulation and coding indicator, a set selection unit for selecting the set of predefined modulation and coding schemes from at least two predefined sets—the first set and the second set, which have a plurality of modulation and coding schemes in common and differ in that the second set further includes an additional modulation with an order higher than any modulation in the first set, and the first set and the second set have the same size; and a data reception unit for receiving the data on the scheduled resources using the selected modulation and coding.

Advantageously, the modulation and coding schemes in each of the sets are associated with the values of modulation and coding indicator, a plurality of the modulation and coding indicator values refer to the respective same modulation and coding schemes in the first and in the second set, and the remaining modulation and coding indicator values refer in the second set to the highest-order modulation and in the first set to modulation(s) of one or more lowest order(s).

According to an embodiment of the present disclosure, M lowest values of the modulation and coding indicator, M being an integer, refer to: the modulation and coding schemes with the lowest-order modulation in the first set and the modulation and coding schemes with the highest-order modulation in the second set.

The second set may be constructed in such a way that it does not include modulation with the lowest order included in the first set.

According to an embodiment of the present disclosure, K values of the modulation and coding indicator, K being an integer, refer to the same modulation and coding schemes with the lowest-order modulation in both the first and the second set, L values refer to the modulation and coding schemes with the lowest-order modulation in the first set and the modulation and coding schemes with the highest-order modulation in the second set, and the remaining values of the modulation and coding indicator refer to the same modulation and coding schemes lower than the highest-order modulation.

Advantageously, the K values correspond to the first K values of the index and the L values are L values immediately following the K values.

According to an embodiment of the present disclosure, the modulation and coding indicator is associated with a modulation and coding scheme including a modulation order and a size indicator indicating at least one of (i) the number of bits in a transport block which is to be mapped onto physical resources and (ii) retransmission without specific indication of the transport block size.

According to an aspect of the present disclosure, a method is provided for receiving data from a network node in a communications system, the method comprising the steps of: receiving scheduling information specifying resources on which data are to be transmitted and including a modulation and coding indicator; selecting modulation and coding from a set of predefined modulation and coding schemes according to the modulation and coding indicator, selecting the set of predefined modulation and coding schemes from at least two predefined sets—the first set and the second set, which have a plurality of modulation and coding schemes in common and differ in that the second set further includes an additional modulation with an order higher than any modulation in the first set, and the first set and the second set have the same size; and transmitting the data on the scheduled resources using the selected modulation and coding.

According to another aspect of the present disclosure, a method for transmitting data in a communications system is provided, the method comprising: transmitting scheduling information specifying resources on which the data are to be transmitted and including a modulation and coding indicator; selecting modulation and coding from a set of predefined modulation and coding schemes according to the modulation and coding indicator, selecting the set of predefined modulation and coding schemes from at least two predefined sets—the first set and the second set, which have a plurality of modulation and coding schemes in common and differ in that the second set further includes an additional modulation with an order higher than any modulation in the first set, and the first set and the second set have the same size; and receiving the data on the scheduled resources using the selected modulation and coding.

Advantageously, the selection of the set of modulation and coding schemes is performed based on a set selection indicator exchanged between the transmitter and the receiver. In particular, the transmitter of data may perform scheduling for the transmission and/or reception resources and indicate the settings to the receiver of data. In addition, the transmitter may indicate to the receiver also the choice of the set of modulation and coding schemes.

In particular, the set selection indicator may be signaled by means of a higher-layer signaling. For instance, the scheduling information is signaled on physical layer and the set selection indicator is signaled on the MAC (medium access control) or RRC (radio resource control) layer.

Alternatively, the set selection indicator may be signaled on the same layer as the scheduling information, for example on the physical layer. For instance, it may be signaled within the control information which includes the scheduling information. Some fields used for other purposes may be used to signal the set selection indicator. For instance, the redundancy version field used for signaling the version of the redundancy for the hybrid ARQ protocol or new data indicator used for distinguishing between first transmission and retransmission may be used. In particular, some of the values (or a single value) of the RV or NDI may be used to indicate that a first set is to be used and some values (or a single value) of the RV or NDI may be used to indicate that a second set shall be used.

Alternatively, the selection of the set of modulation and coding schemes is performed by both receiver and transmitter of the data based on the channel conditions of their communication channel. For instance, the transmitter of data receives indication of the channel conditions from the receiver of the data and selects the set accordingly. The receiver also selects the set according to the channel conditions reported to the transmitter. This approach is implicit and does not require any additional signaling. The transmitter and receiver use the same rules to select the set in dependency of the channel conditions reported.

Preferably, the set selection indicator is signaled (transmitted/received) less frequently than the scheduling information.

It is noted that there may be also other differing entries in the different sets than the entries belonging to the new modulation.

According to an aspect of the present disclosure a computer-readable medium is provided with a computer-readable program thereon, which, when executed on the computer, implements the steps of the method according to the present disclosure.

According to an advantageous embodiment, the present disclosure is applied to LTE system (for instance Release-11 of the LTE). In particular, the data transmitter may be the eNodeB and the data receiver may be the terminal. The data are transmitted over PDSCH and the control information including the scheduling information is transmitted on the PDCCH. The scheduling information may be carried by the DCI. The DCI may include, as is the case in the Release-11 LTE, an MCS index specifying the modulation and coding scheme to be used from among a set of modulation and coding schemes, which are predefined in a so-called MCS table. In compliance with the disclosure, more than one MCS tables may be defined, from which one is used at a time. The MCS table is selected based on the signaled information at the terminal or based on the channel conditions. The MCS table is chosen by the eNodeB based on channel conditions and the choice may be or does not need to be signaled to the terminal.

BRIEF DESCRIPTION OF THE SEVERAL VIEWS OF THE DRAWINGS

The above and other objects and features of the present disclosure will become more apparent from the following description and preferred embodiments given in conjunction with the accompanying drawings in which:

FIG. 6 is a table illustrating an example of a modulation and coding scheme table (MCS Table) in a downlink as defined for 3GPP LTE;

FIGS. 10A and 10B are examples of MCS tables in accordance with an embodiment of the present invention;

FIGS. 13A and 13B are examples of MCS tables in accordance with an embodiment of the present invention;

FIGS. 16A and 16B are examples of MCS tables in accordance with an embodiment of the present invention;

DETAILED DESCRIPTION

Figure 1:
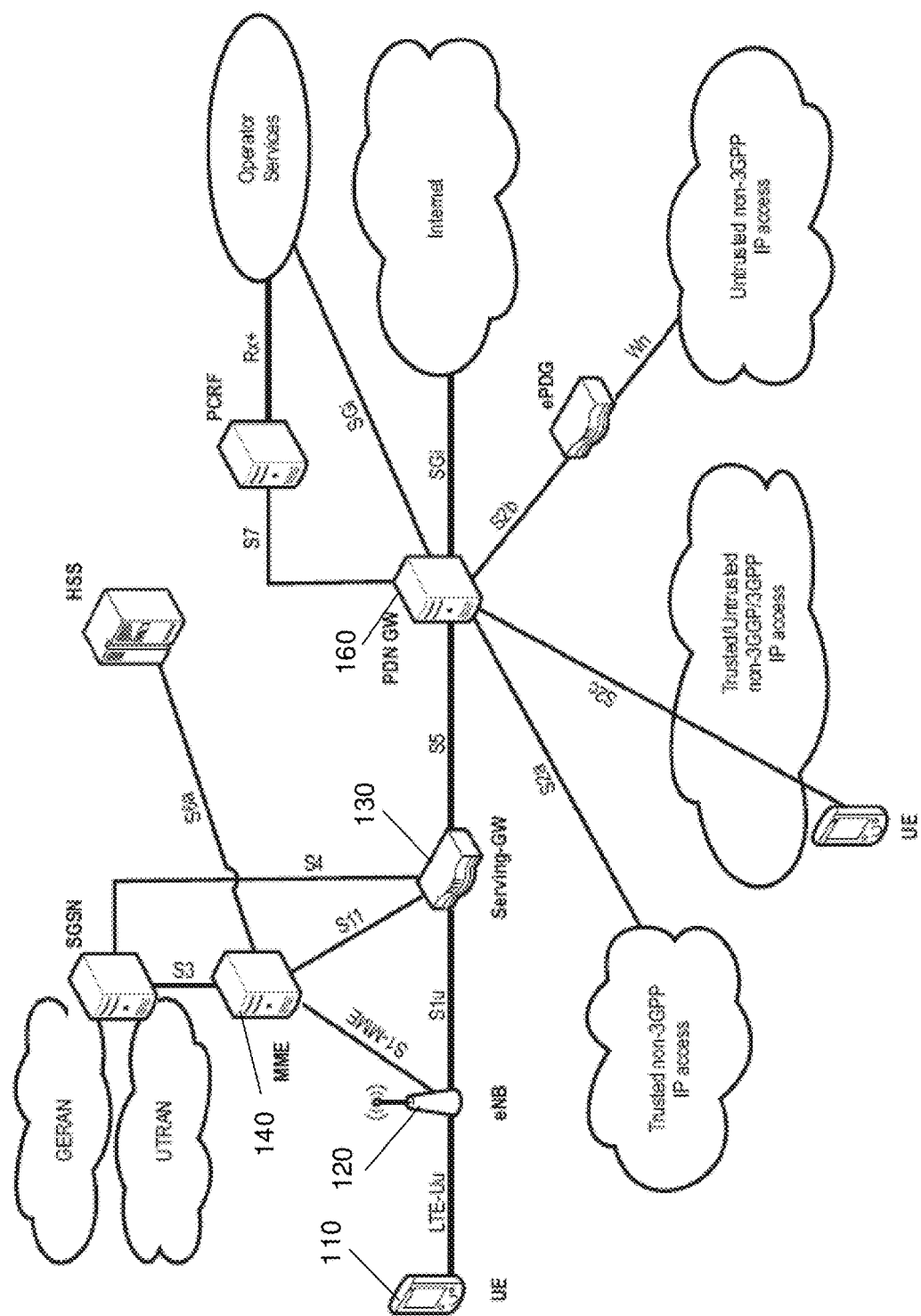
FIG. 1 is a schematic drawing showing the general structure of a subframe on a downlink component carrier defined for 3GPP LTE.
Figure 2:
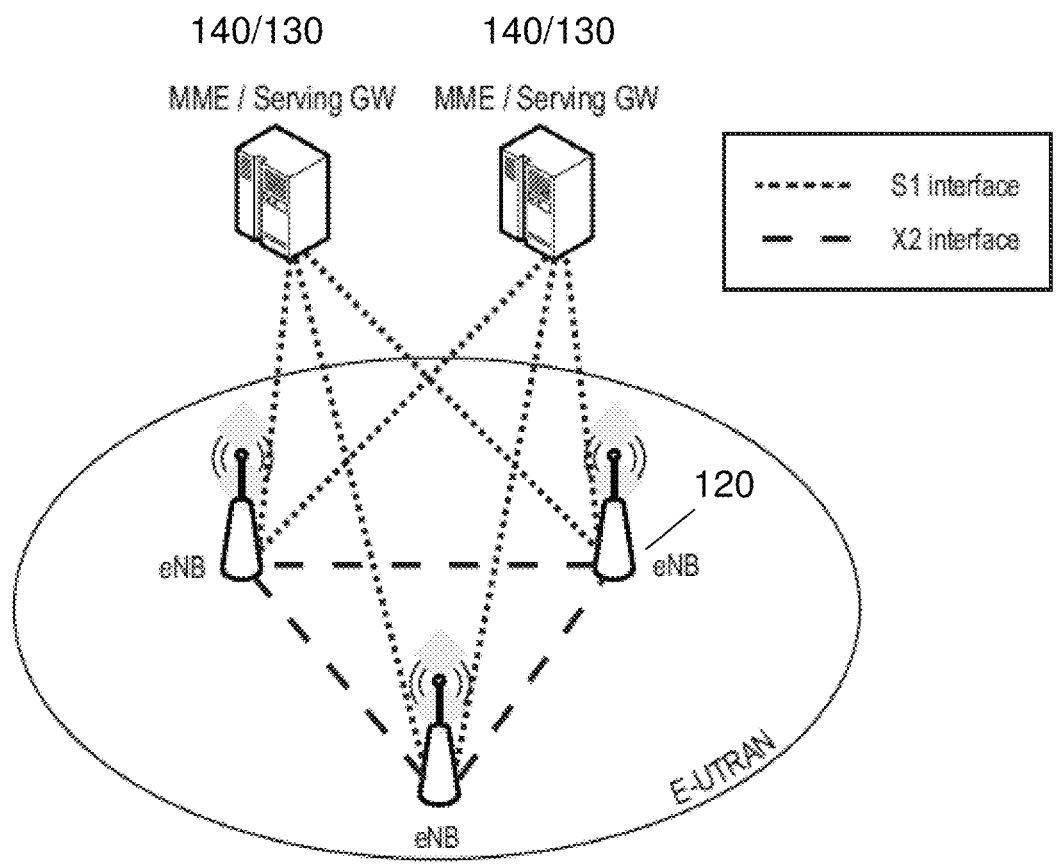
FIG. 2 shows an exemplary overview of the overall E-UTRAN architecture of 3GPP LTE.
Figure 3:
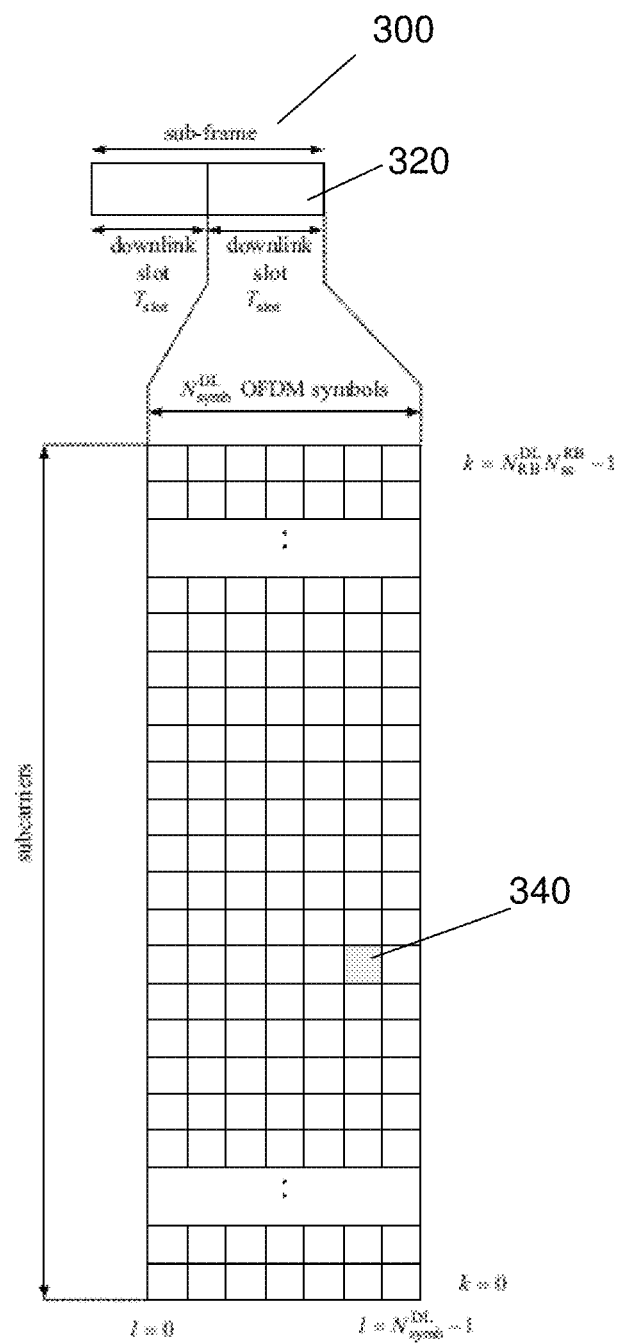
FIG. 3 shows an exemplary subframe boundary of a downlink component carrier as defined for 3GPP LTE.
Figure 4:
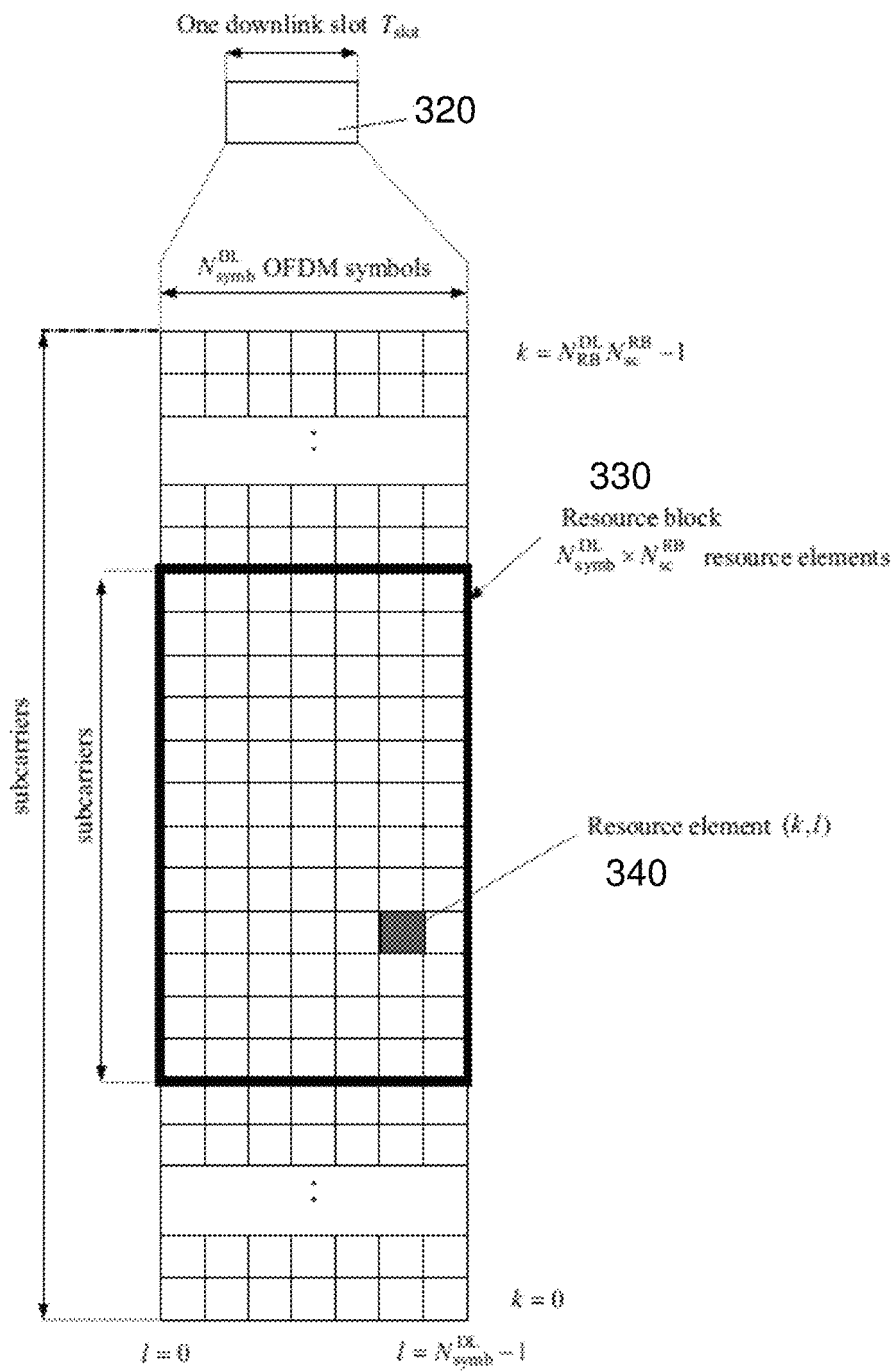
FIG. 4 is a schematic drawing illustrating an example of a resource grid in a downlink slot in 3GPP LTE.

The following paragraphs will describe various embodiments of the disclosure. For exemplary purposes only, the embodiments are outlined in relation to radio access schemes according to 3GPP LTE (Release 8/9) and LTE-A (Release 10/11) mobile communication systems, which were partly discussed in the technical background section above. It should be noted that the disclosure may be used, for example, in a mobile communication system such as 3GPP LTE-A (release 11) communication systems as described in the technical background section above, but the disclosure is not limited to its use in these particular exemplary communication networks. The disclosure may be, for example, used in non-3GPP systems such as WIMAX.

The present disclosure can be advantageously applied as a strategy for indicating the modulation and coding scheme (MCS) for data transmissions in an LTE system. The currently supported set of modulation schemes in Release 11 consists of QPSK, 16-QAM and 64-QAM. However, especially for the scenarios, in which the terminal is likely to experience rather stable and good channel conditions in terms of high SINR levels, higher modulation orders may be desirable for achieving higher spectral efficiencies. In particular, 256-QAM may be applied to further extend the range of spectral efficiencies configurable. First performance evaluations have shown that the use of 256-QAM is expected to be reasonable with SINR levels of at least 20 dB. The MCS that is used for PDSCH and PUSCH transmissions has up to now been indicated in an MCS field within the downlink control information (DCI). In view of this existing mechanism, it is desirable to ensure that the current signaling scheme can be reused due to backward compatibility. Moreover, the robustness of the signaling with respect to the transmission errors should also be maintained as far as possible. In accordance with some advantageous embodiments of the present disclosure, concepts for mapping code points of the Release-11 MCS field to modulation and coding schemes comprising 256-QAM is provided by reinterpreting code points of low order modulation schemes.

One possibility of extending the achievable spectrum efficiencies is to extend the MCS table by a certain set of entries for 256-QAM with different TBS indices. The MCS field within the DCI has to be extended accordingly, in order to cover the resulting increased set of modulation and coding schemes. The minimum MCS field extension consists of a single additional bit which doubles the number of MCS field code points. Since the current Release-11 MCS field has a length of five bits, the number of code points would be extended from 32 to 64. The set of modulation and coding schemes could therefore be extended by 32 new entries for 256-QAM.

The current Release-11 TBS table does not support transport block size large enough for efficiently making use of 256-QAM which supports very high spectral efficiencies obtained by mapping eight bits onto a single 256-QAM modulation symbol. Thus, also the TBS table should advantageously be extended by further rows for transport blocks larger than the blocks currently supported. This corresponds to the support of higher SINR levels.

Figure 9:
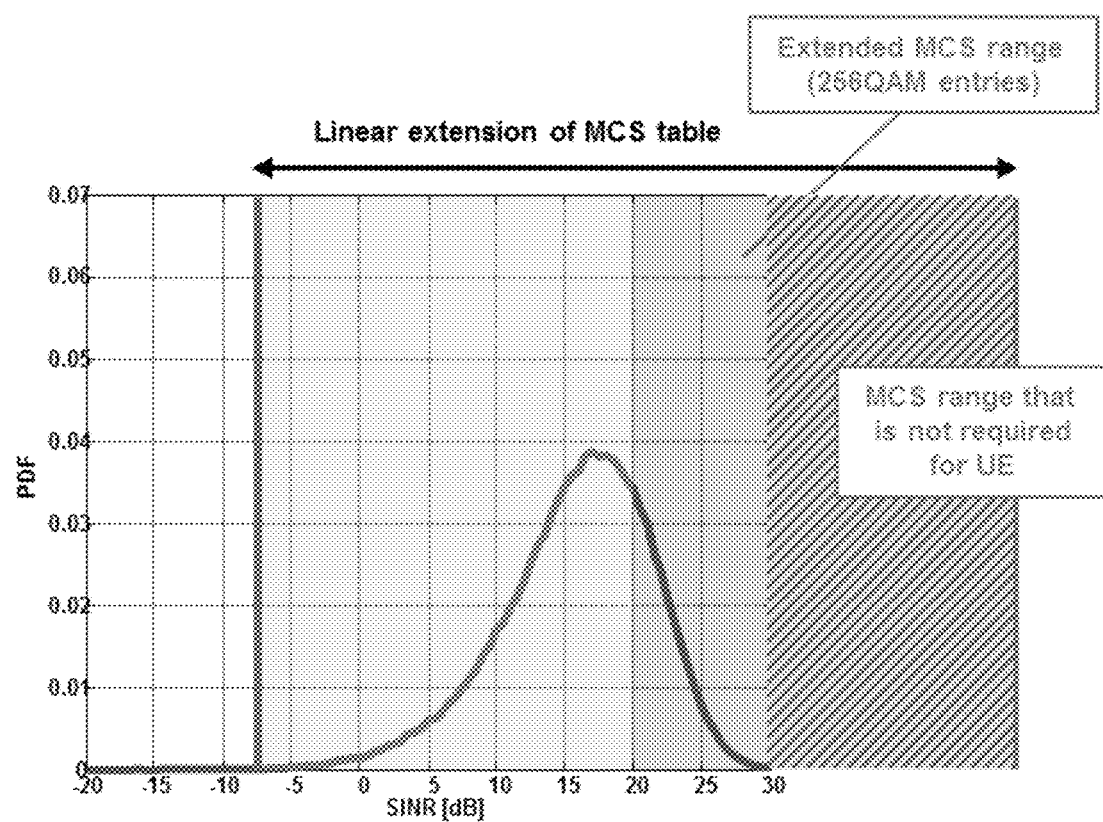
FIG. 9 is a graph exemplifying a distribution of SINR for a set of modulation and coding indicator extended by one bit.

Assuming that the number of MCS indices is doubled and that the equidistant SINR quantization by approximately 1-dB steps is kept, the above approach results in extending the SINR range from 27 dB currently covered in Release-11 to 54 dB. The effect is shown in FIG. 9 for a cell-center UE with high average SINR level. All SINR samples of the UE are covered by the new MCS table. However, a huge fraction of the extended MCS table covers very high SINR levels that will most likely not be used.

Moreover, the DCI carrying the MCS indicator is mapped onto a set of fixed-size resources. Accordingly, the size of the DCI determines the robustness of the signaling carried thereby since it determines how much redundancy is to be used for the transmission of the DCI and thus, also of the MCS indicator included therein. The smaller the DCI that is mapped onto a certain resource, the larger is the redundancy and hence the robustness. Thus, the DCI size should in general be kept as small as possible.

Another problem of the above described approach of extending the MCS index by a further bit is that the number of 32 new MCS indices is much larger than the set of code rates currently supported, and hence also of the transport block sizes which can be supported by the 256-QAM. Extending the modulation order would also further require a set of additional code points in the TBS index.

The problem underlying the present disclosure is based on the observation that it is not likely for a UE to experience an SINR fluctuation of more than 50 dB, if the position and hence pathloss and shadowing conditions do not change significantly, which is expected to be the case also for the indoor applications. Therefore, the aim is to primarily cover the expected SINR level distribution of different UEs by a proper MCS table design.

Even when the above solution and problem have been described for LTE, it is noted that any communications system employing adaptive modulation and coding scheme may beneficially employ the present disclosure. In order to support the adaptive modulation and coding, an apparatus which is to be able to receive the data (for instance a terminal) from another apparatus (such as a network node) in the communications system may include a control information reception unit for receiving scheduling information specifying resources on which data are to be transmitted and including a modulation and coding scheme indicator and a data transmission unit for transmitting the data on the scheduled resources using the modulation and coding scheme indicated by the modulation and coding scheme indicator. It is noted that in general the data receiving apparatus is not necessarily a terminal. It may be also a relay or a base station (for instance in uplink) or any other network node.

Moreover, in order to avoid extension of the modulation and coding indicator by further bit(s), an apparatus for receiving data in the communications system in accordance with the present disclosure comprises also a modulation and coding selection unit capable of selecting modulation and coding from a set of predefined modulation and coding schemes according to the modulation and coding indicator; and a set selection unit for selecting the set of predefined modulation and coding schemes from at least two predefined sets—the first set and the second set, which have a plurality of modulation and coding schemes in common and differ in that the second set further includes an additional modulation scheme with an order higher than any modulation scheme in the first set, and the first set and the second set have the same size.

The above apparatus is an apparatus which receives the data and the scheduling information. However, the present disclosure also relates to a corresponding apparatus for transmitting the data in a communications system and comprising a control information transmission unit for transmitting to the terminal scheduling information specifying resources on which the terminal is to transmit data to the network node and including a modulation and coding indicator; a modulation and coding selection unit capable of selecting modulation and coding from a set of predefined modulation and coding schemes according to the modulation and coding indicator; a set selection unit for selecting the set of predefined modulation and coding schemes from at least two predefined sets—the first set and the second set, which have a plurality of modulation and coding schemes in common and differ in that the second set further includes an additional modulation scheme with an order higher than any modulation scheme in the first set, and the first set and the second set have the same size; and a data reception unit for receiving the data from the terminal on the scheduled resources using the selected modulation and coding.

For the exemplary case of LTE communication over PDSCH as described above, the receiving apparatus may be a terminal, while the transmitting apparatus may be an eNodeB or a relay. However, the receiving apparatus may also be a relay node and the transmitting apparatus may be an eNodeB. In general, the present disclosure is not limited to a particular direction uplink/downlink and also not to a particular type of the network nodes.

More particularly, the modulation and coding schemes in each of the sets (the first set and the second set) may be associated with the values of modulation and coding indicator, wherein a plurality of the modulation and coding indicator values refer to the respective same modulation and coding schemes in the first and in the second set, and the remaining modulation and coding indicator values refer in the second set to the highest-order modulation and in the first set to the lowest-order modulation(s). It is noted that it is not necessarily only one lowest-order modulation. As can be seen in FIG. 10B, the remaining modulation and coding indicator values may refer in the second set to the highest-order modulation and in the first set to modulation(s) of one or more lowest order(s). For example, FIG. 10B shows that the modulation and coding schemes using modulation order 8 (256-QAM) replace not only the schemes of modulation order 2 (QPSK) but also some schemes of modulation order 4 (16-QAM) from the table of FIG. 6.

It is noted that even when the sets of the modulation and coding schemes are described above by means of tables, the actual implementation of the sets is immaterial to the present disclosure. The tabular form merely visualizes the set of the values and is also used in the current LTE specifications.

The approach of the present disclosure, when exemplarily applied to the above described situation in LTE Release-11, enables to reinterpret the current MCS indices in order to support a new modulation scheme, such as 256-QAM for PDSCH transmissions without extending the MCS field within the DCI by further bits. This is advantageously achieved by replacing some entries for a low-order modulation by entries for a new, high-order modulation. The rationale is that an UE that will be a candidate for PDSCH transmissions with higher-order modulation schemes will probably not be used at the same time for transmissions with low-order modulation schemes. This would be, for instance, the case for indoor UEs with restricted mobility which are located close to a base station (eNB). It is noted that in view of the current LTE system, extension to 256-QAM is of advantage. However, the present disclosure is not limited thereto. In particular, higher-order modulations may be applicable in future. Moreover, the modulation schemes selectable for the transmission are generally not limited to quadrature amplitude modulations and may include any other frequency, phase, amplitude modulation or combinations thereof including the trellis and coset coding modulation.

In case of the LTE-example, the first set may include modulation and coding schemes including QPSK, 16-QAM and 64-QAM and the second set may include modulation and coding schemes including the same modulations and, in addition, 256-QAM. It is also be possible to construct a second set which does not include the modulation of the lowest order at all, such as QPSK in this example.

It is further noted that the present disclosure is not limited to two alternative sets of modulation and coding schemes. A plurality of sets may be employed. Additional alternative MCS tables selectable enable finer adaption of the SINR range covered by the terminal channel conditions and/or supporting of a generally higher SINR range. This may be particularly advantageous for communication systems with various kinds of deployment scenarios resulting in different channel conditions such as heterogeneous cellular and/or mobile networks.

FIGS. 10A and 10B show examples of an MCS table in accordance with an embodiment of the present disclosure. According to this embodiment, the M lowest values of the modulation and coding scheme indicator, M being an integer, refer to:

the modulation and coding schemes with the lowest-order modulation in the first set, and the modulation and coding schemes with the highest-order modulation in the second set.

More particularly, as can be seen in FIG. 10B, the second set does not include modulation with the lowest order included in the first set. However, this is only an example, and—as is clear from the example of FIG. 10A—other arrangements may be beneficial, which also include schemes with the lowest-order modulation. In particular, FIG. 10A shows an arrangement, according to which only some (not all) of the modulation and coding schemes with the lowest-order modulation are replaced with the highest-order modulation.

In particular, the modulation order of M lowest MCS indices in the table shown in FIG. 6 is set to 8 (from 2), which corresponds to 256-QAM (instead of QPSK). FIG. 10A shows an example in which M=6 and FIG. 10B shows an example in which M=18. However, in general, the present disclosure is not limited thereto and any M may be selected. Accordingly, the M first indices of the first table (such as the table of FIG. 6) are reinterpreted in the second table. The remaining indices of both tables refer to the same modulation and coding schemes. In the table of FIG. 6, the M first indices correspond to the indices belonging to the lowest modulation order and, in particular, correspond to the lowest spectral efficiencies.

In this example, the TBS indices for the MCS indices with the overwritten modulation order (the entries of the table corresponding to 256-QAM) are set to values (cf. values higher than 26 in the exemplary MCS tables), which are linked with transport block sizes that are larger than the currently supported sizes for modulation orders of up to 6, which corresponds to 64-QAM. The maximum TBS index in Release-11 is 26. The TBS table has to be then extended by entries for TBS indices larger than 26. The TBS indices of the adapted entries range from 26 to 31 in the first adapted MCS table (FIG. 10A), and from 26 to 43 in the second adapted MCS table (FIG. 10B). The lowest TBS index (26) for 256-QAM is the same as the highest for 64-QAM. That means that a certain spectral efficiency can be achieved by using either 64-QAM with high code rate, or 256-QAM with low code rate. Which one will be used for data transmissions depends on the channel conditions and the transmitter and receiver characteristics. The same approach is used in Release-11 for the transitions between QPSK and 16-QAM, and between 16-QAM and 64-QAM. However this is only an example which means that, in general, this "repetition" does not have to be applied for the present disclosure.

The TBS table extension is immaterial for the present disclosure. It can be assumed here that the TBS table is extended by a sufficient number of entries in order to support the required set of code rates for the modulation and coding schemes including the new 256-QAM. It is further noted that the present disclosure is not limited to the formats of signaling applied in the LTE. The set of modulation and coding schemes may correspond to the MCS table as defined in LTE, however does not necessarily need to. Accordingly, the present disclosure may support modulation and coding schemes given by the modulation order (since modulation type is fixed) and by the transport block size index referring to particular transport block sizes depending on the number of resource blocks allocated (signaled within the scheduling information). However, in general, the present disclosure may apply also to modulation and coding schemes with different modulation types and/or orders. The "coding" may be indicated by means of transport block size or by means of the coding type applied or in any other means. Moreover, the modulation and coding scheme is not limited to include only a modulation and coding and it may include further indications related to the data format such as redundancy version (the case for the uplink in LTE) or other parameters.

Figure 11:
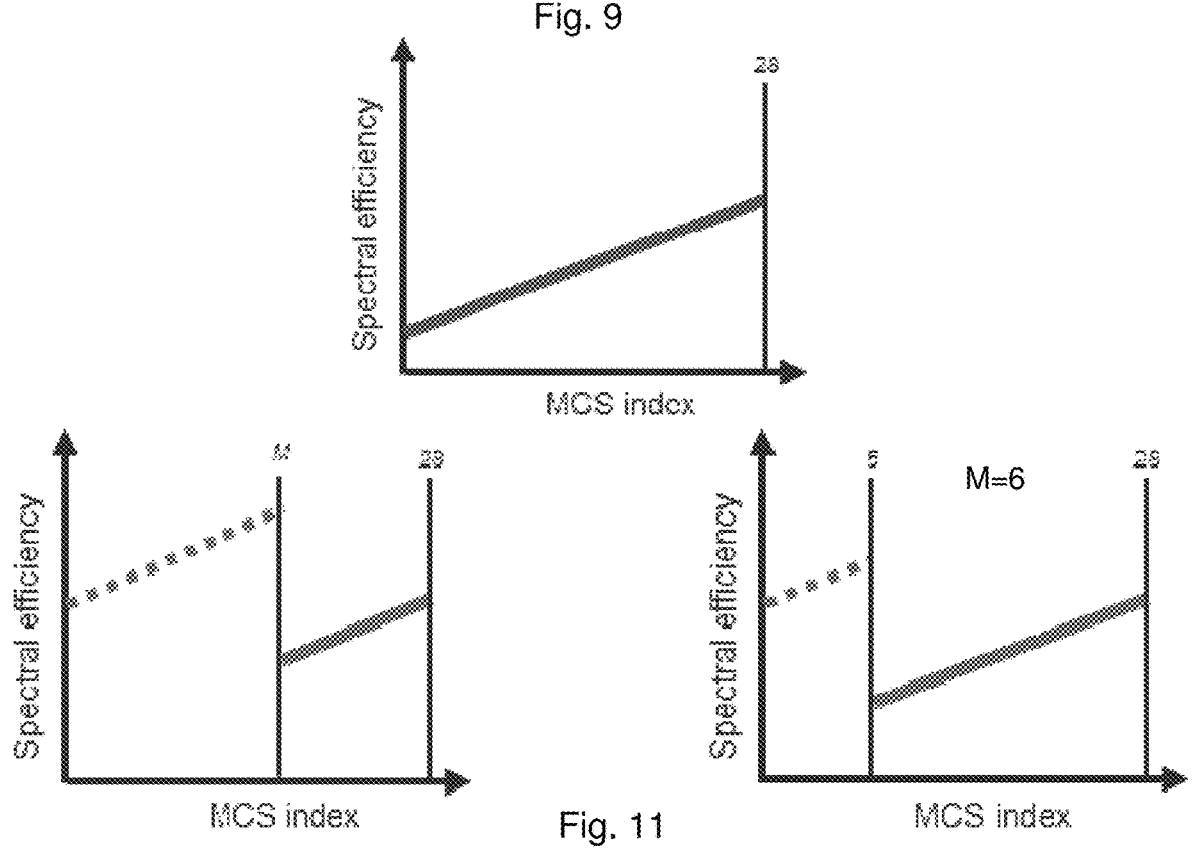
FIG. 11 is a schematic drawing illustrating the spectral efficiency for the indices of different MCS tables.

The relation between the MCS index and the spectral efficiency of the Release-11 MCS table is shown schematically in FIG. 11 in the top graph. The spectral efficiency that is determined by the TBS is in the current MCS table (shown in FIG. 6) increased essentially linearly with the MCS index. The reoccurring of certain spectral efficiencies at switching points between different modulation orders is neglected in the representation of FIG. 11 for the sake of clarity.

The graphs on the bottom of FIG. 11 show how the spectral efficiencies are changed for low MCS indices of the MCS tables shown in FIGS. 10A and 10B, which now support 256-QAM. Since each spectral efficiency value correspond to a certain SINR level, it can be seen that the SINR range covered by each MCS table is shifted from lower to higher SINR levels. The graph on the left side of FIG. 11 illustrates the general case in which there are M first values of the first MCS table (Table of FIG. 6) replaced by the entries with highest-order modulation, namely the 256-QAM. The graph on the right side of FIG. 11 illustrates the case in which M=6 (the index numbering in these examples starts with 0).

Each UE is expected to be operated within a certain SINR range that is determined by its position (location with respect to the base station) and multipath channel properties in particular in terms of small-scale fading. The idea underlying the present disclosure is to reinterpret MCS indices and thus shift the SINR range that is covered by the MCS table rather than to extend the SINR range. It is expected that the current SINR range in LTE of approximately 27 dB is sufficient for all UEs. As is understood by those skilled in the art, an appropriate shift should be applied in order to cover the real SINR levels experienced by the UEs in the cell of the communications system.

The present disclosure may be advantageously employed in that two or more different MCS tables, which cover different SINR ranges, are defined in the communication standard such as the LTE specification, and each terminal is informed about the MCS table to be used for the PDSCH transmissions. Exemplary ways in which the terminals obtain the information regarding the MCS table shall be discussed later.

Figure 5A:
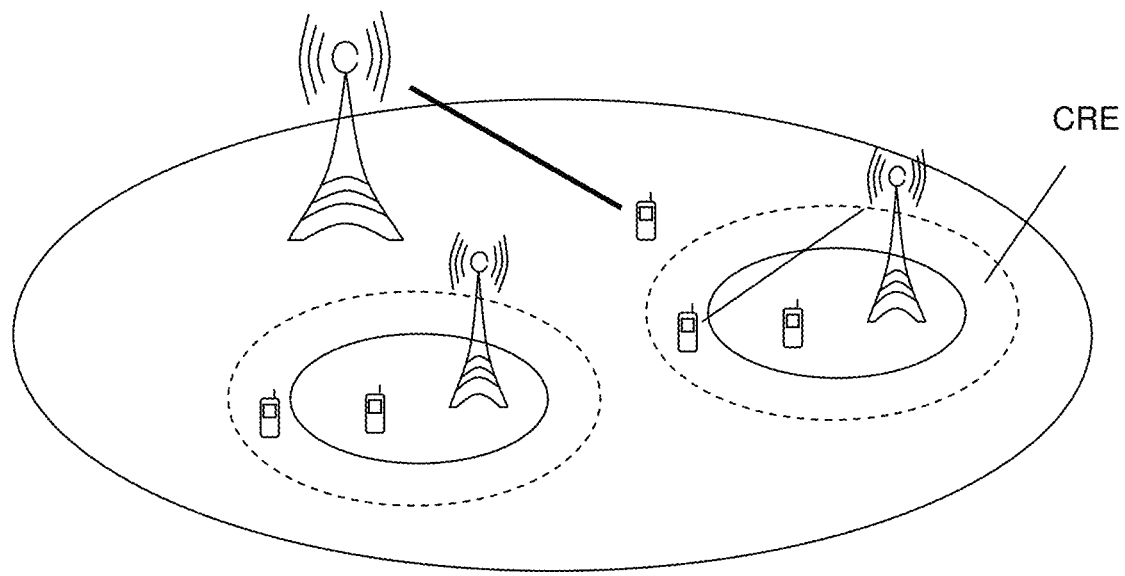
FIGS. 5A and 5B show a heterogeneous network (HetNet) with one macro cell and various picocells.
Figure 5B:
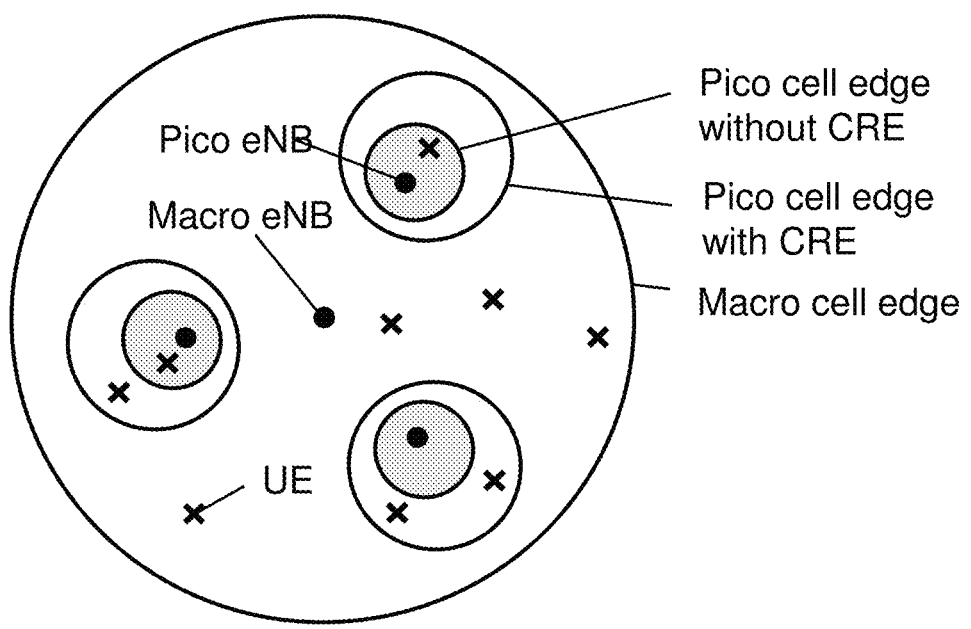
Figure 7:
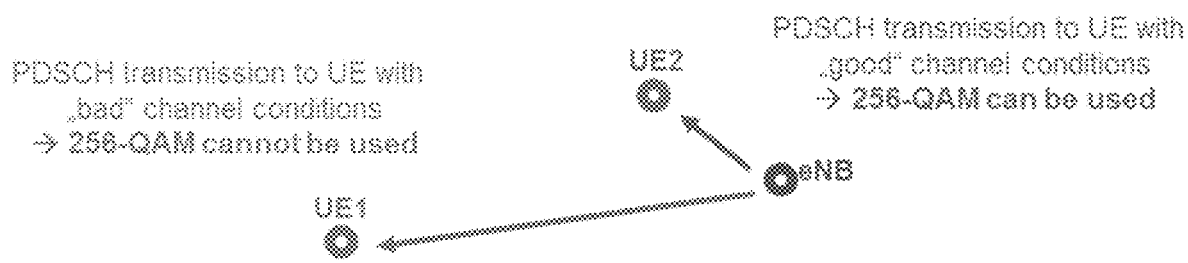
FIG. 7 is a schematic drawing illustrating communication of two terminals with different channel conditions in a cell.

Since the different MCS tables are to cover different SINR ranges, it can also be beneficial to allow the support of different MCS tables for different subframe sets or subbands in order to support different interference conditions on these sets of radio resources. For instance, different MCS tables may be supported for low power subframes than for the regular subframes. Accordingly, a terminal may automatically select a first table for the transmission in the low power subframes and a second table for the transmission in the remaining subframes. In particular, transmission in the low power subframes may employ an MCS table with more lower-order modulations in order to be more robust, while the transmission in the remaining subframes may use another MCS table including a higher-order modulation in accordance with any embodiment of the present disclosure. Low-power subframes are employed especially in the field of radio transmission and, in particular, for the heterogeneous networks. Accordingly, some subframes are transmitted with a reduced power, which is generally kept lower than the transmission power of the remaining (regular) frames. The power may be limited by a threshold. The limited power frames are particularly useful at the borders of the pico cells at which the pico cell receiver and the larger cell receiver signals may interfere. They enable a terminal to receive data from pico cells even when the base station of the macro cell is more powerful (cf. FIGS. 5A and 5B and the related description above).

Moreover, different component carriers may employ different MCS tables, meaning that the MCS table can be selected by the terminal differently for different component carriers.

Figure 8:
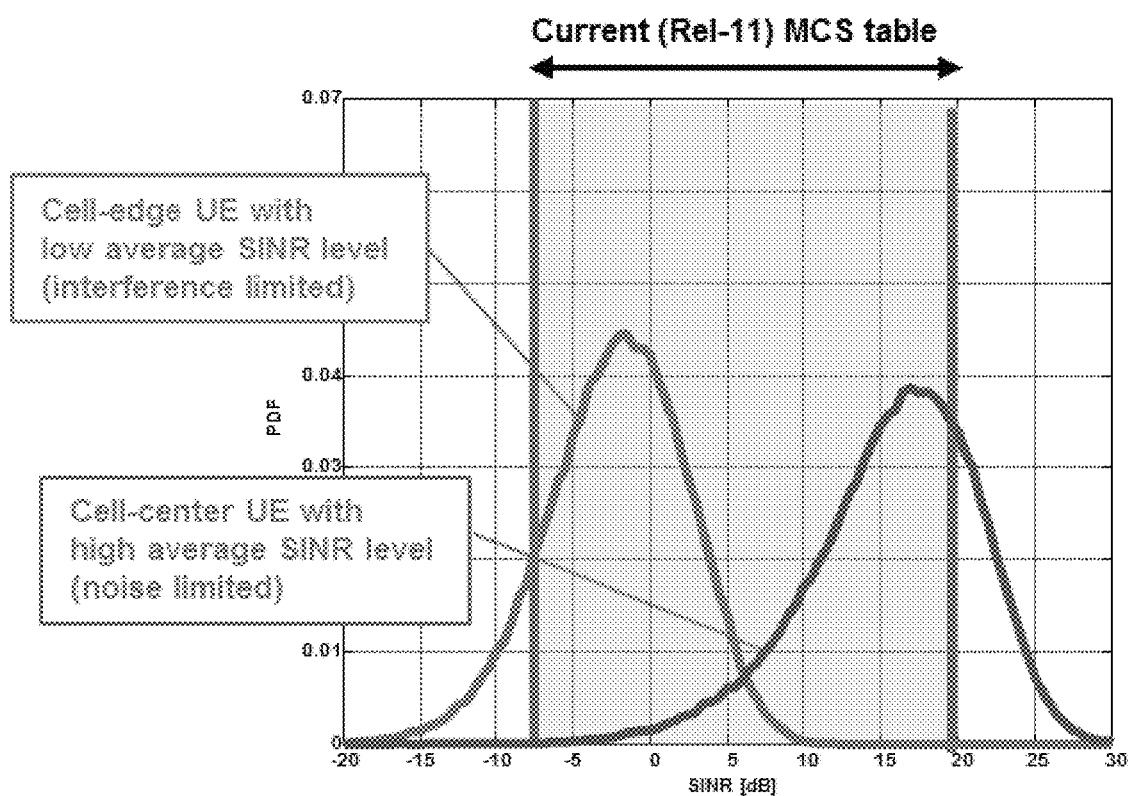
FIG. 8 is a graph exemplifying a distribution of SINR for two terminals with different channel conditions.
Figure 12:
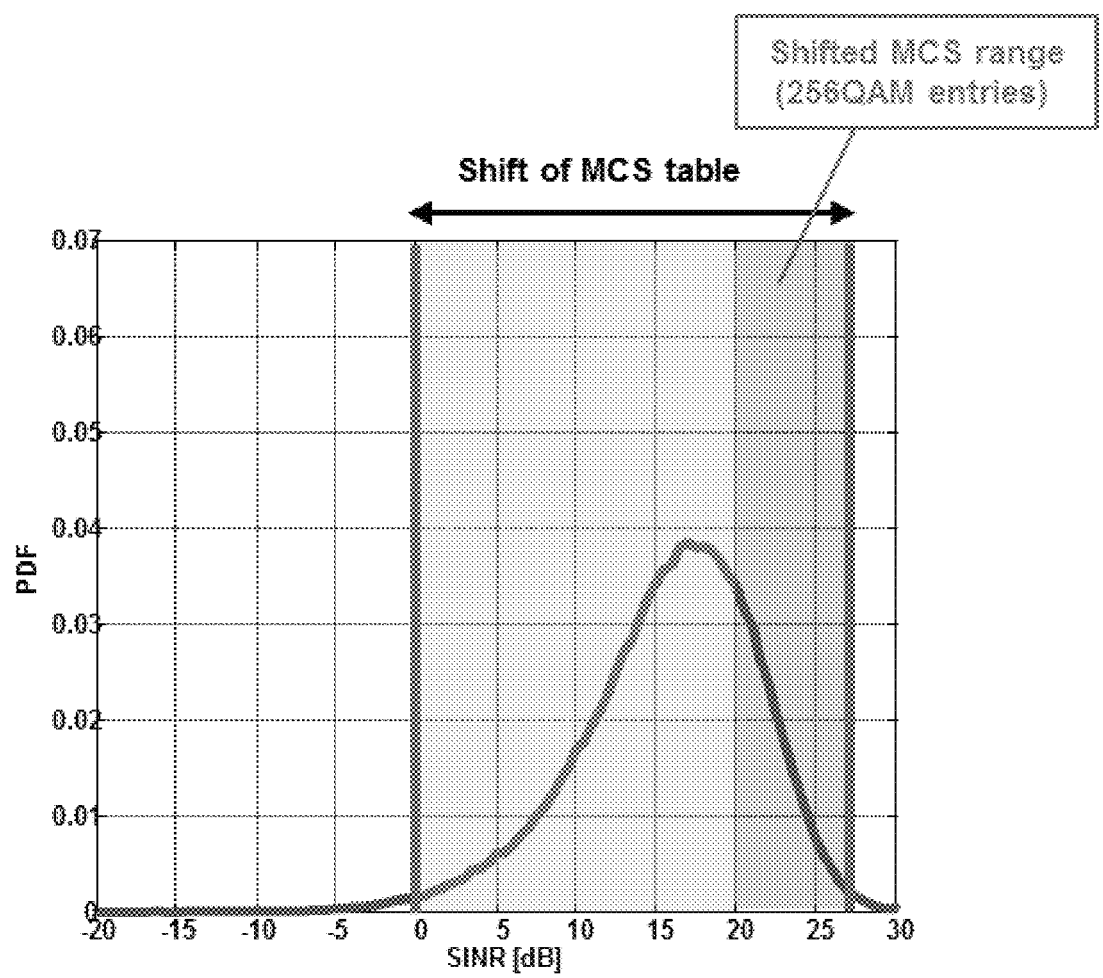
FIG. 12 is a graph exemplifying a distribution of SINR for the MCS table according to an embodiment of the present invention.

FIG. 12 shows exemplarily the RB SINR level distribution of a typical cell-center UE and the corresponding appropriate MCS table shift that covers more or less all SINR samples. As can be seen when compared to FIG. 8, the SINR range width has not been changed but rather the SINR range has been shifted towards the higher SINRs. Accordingly, in the above described embodiment, linear shift of the SINR range covered by the MCS table is performed.

Correspondingly, in the example tables of FIG. 10, the most robust (low-order modulation(s), small transport block size) modulation and coding schemes have been replaced by the most spectrum-efficient (high-order modulation(s), large transport block sizes) schemes. This means that very robust combinations of modulation and coding scheme are not available anymore if MCS table entries for 256-QAM are supported.

However, sometimes it may be desirable to support a certain set of very robust combinations of modulation and coding even in case of very good average channel conditions, i.e., in case of average to high SINR level.

Thus, according to another embodiment of the present disclosure, K values of the modulation and coding indicator, K being an integer, refer to the same modulation and coding schemes with the lowest-order modulation in both the first and the second set, L values, L being an integer, refer to the modulation and coding schemes with the lowest-order modulation in the first set and the modulation and coding schemes with the highest-order modulation in the second set, and the remaining values of the modulation and coding indicator refer to the same modulation and coding schemes lower than the highest-order modulation.

It is noted that according to an advantageous implementation, the K values are the K lowest values of the modulation and coding indicator and the L values are the L values following the K values.

An example of possible MCS tables according to such advantageous implementation is illustrated in FIGS. 13A and 13B. The tables may be respectively advantageous for two different UEs with different average channel conditions. In both MCS tables of FIG. 13, the lowest K=2 entries are not overwritten in order to support very robust data transmissions. It is noted that the value K=2 has been chosen exemplarily. Alternatively, there may be also a single one most robust modulation and coding scheme (K=1) left (for instance also in the first position in the MCS table, i.e., having the lowest index value in the set). However, K may also be larger. In FIG. 13A, L=4, whereas in FIG. 13B, L=16.

The particular selection of M, K, L in the above embodiments is to be performed according to the scenarios, in which the devices of the communications system taking part on the communication using the adaptive modulation and coding typically operate. As is clear to those skilled in the art, in order to determine M, K, L, measurements/estimation of the SINR for the desired deployment scenarios should be performed and based thereon decided, which SINR range is to be covered by the respective sets of the modulation and coding schemes.

It is noted that these exemplary MCS tables of FIG. 13, as well as the tables of FIG. 10, represent separate tables: the communication system nodes (terminal, relay and/or base station, eNodeB) may be configured to use the table of FIG. 6 as the first set and the table of FIG. 10A (or alternatively 10B or alternatively 13A or 13B) as the second set. This means that there may be only two sets selectable. This scenario has an advantage of low signaling overhead when the selection of the set is to be signaled from the transmitter of data to the receiver of data. Still, having two sets of modulation and coding schemes suffices to distinguish between the devices (terminals, relays) operating in the range of lower to normal SINRs and the devices operating in the range of high SINRs, for instance due to a deployment scenario such as pico-cell in an indoor environment with line of sight to the base station (or relay) and/or located near to the center of the cell.

However, the present disclosure is not limited thereto. There may be more than two sets of modulation and coding schemes selectable. For instance, there may be a the set of FIG. 6 and two other sets of the respective FIGS. 10A and 10B, or sets of the FIGS. 10A and 13B, or any other combination. It may be beneficial to have more than three sets to select. This will depend on the amount of distinct scenarios in which a device is to be capable to operate, in particular with respect to the range of SINRs (and, correspondingly, range of spectral efficiency).

Figure 14:
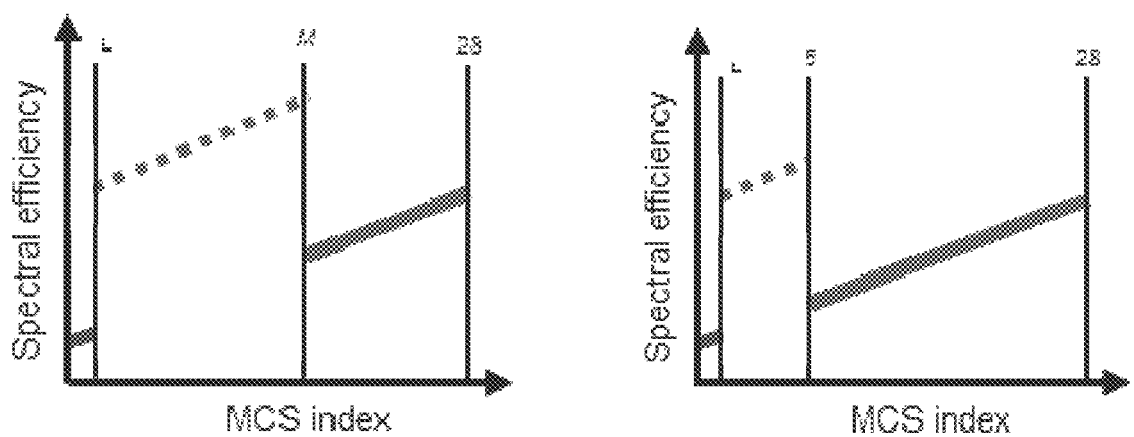
FIG. 14 is a schematic drawing illustrating the spectral efficiency for the indices of different MCS tables.

The resulting association between MCS index and spectral efficiency for the example of FIG. 13 is schematically illustrated by the graphs of FIG. 14. In particular, on the left side of FIG. 14, the general case of L and K is shown, which approximately corresponds to the table shown in FIG. 13B, in which K=2 and L=16. On the right side of FIG. 14, the graph corresponds, with K=2 to the table shown in FIG. 13A (with L=4, when the MCS index starts with 0).

Figure 15:
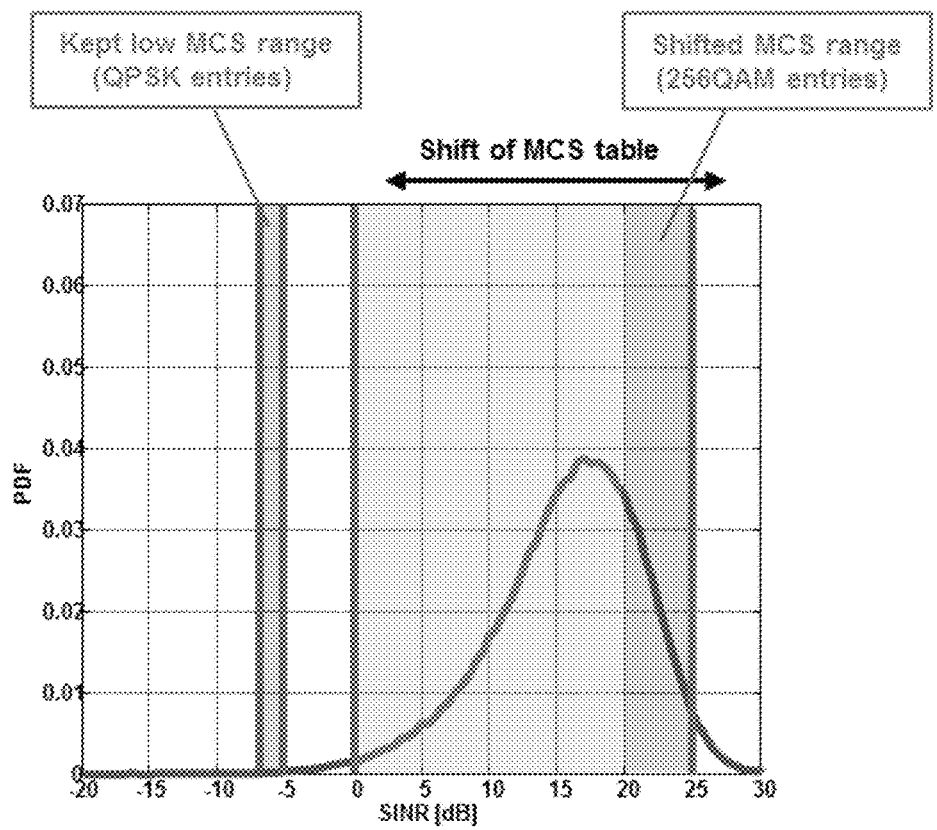
FIG. 15 is a graph exemplifying a distribution of SINR for the MCS table according to an embodiment of the present invention.

FIG. 15 shows how the SINR samples of a typical cell-center UE (a UE which operates in a range of higher SINRs) are covered by the MCS table shown in FIG. 13A. The MCS indices for the low SINR values can always be used for data transmissions on resource blocks with higher SINR levels. However, the opposite is not possible since for the lower SINRs the channel quality would be low and consequently, the error rate too high to be able to decode the data. The MCS indices for very robust data transmissions, such as the first K indices, are beneficial for transmissions of very error sensitive messages such as control messages or user data transmissions with very high quality of service (QoS) requirements in terms of error robustness, which may be in particular the delay sensitive services in which the retransmissions are not feasible. This may be for instance real-time conversational (and/or streaming) applications.

The cost for supporting certain MCS indices for very robust data transmissions is that less MCS levels for very high spectral efficiencies can be supported. This trade-off has to be taken into account when defining an appropriate MCS table. One single MCS index for very robust data transmissions with QPSK should be sufficient since the probability for such high requirements for very robust data transmissions is expected to be very low in case of high average SINR levels, as can be seen in FIG. 15.

As illustrated in the above described figures, the modulation and coding scheme indicator may be associated with a particular modulation and coding scheme including: a modulation order and a size indicator indicating at least one of (i) the number of bits in a transport block which is to be mapped onto physical resources and (ii) retransmission without specific indication of the transport block size. For instance, in FIGS. 6, 10, and 13, the first 29 entries of the respective tables associate the MCS index 0 to 28 with respective combinations of a modulation order and a TBS index. However, the last three indices 29 to 31 indicate for three respective modulation orders 2, 4, and 6 "reserved" which means that these values are reserved for HARQ retransmissions performed with the indicated modulation order. No specific size/number of the transport blocks is necessary to be signaled since the size is determined in a predefined manner from the TBS used for the first transmission.

In accordance with an embodiment of the present disclosure, which is combinable with any of the above described embodiments, for the highest-order modulation in the second set of modulation and coding schemes, also an entry is added indicating retransmission without specifying explicitly the transport block size and the number of transport block as it is done by the TBS index. In particular, the reservation of a certain MCS index for HARQ retransmissions with 256-QAM may be performed by reserving the first index (the lowest value of the modulation and coding indicator). This has the advantage of maintaining the equality of higher-order modulation entries in both (or all) sets so that even when there was a mismatch of set selection between the receiving and transmitting node, in most cases no error would occur. In the same way as done for the other modulation schemes, it is not required to specify a certain TBS index for that entry since the transport block size is known from the initial transmission.

An example, in which MCS index 0 is used for indicating the retransmissions for the highest-order modulation, namely for 256QAM, is shown in FIGS. 16A and 16B. In FIG. 16A, the 5 indices of the MCS index following the first index (with value 0) are dedicated to modulation and coding schemes with the highest-order modulation (order 8, corresponding to 256-QAM), followed by the same schemes as those of FIG. 6 for the index values from 6 to 31. FIG. 16B shows an example, in which the first MCS index (with value 0) is followed by 17 schemes employing the highest-order modulation. Again, the remaining schemes are the same schemes as those of FIG. 6 for the index values from 18 to 31.

It is noted that the reservation of an MCS Index for HARQ retransmissions may also be applied together with maintaining some entries of the lowest-order modulation (as described with reference to FIG. 13). Both variants are possible: the retransmission index may be the first one in the table or it may follow the M lowest-order modulation schemes. Combination of providing an HARQ-reserved index with maintaining some of the most robust modulation and coding schemes provides a high degree of flexibility. HARQ retransmissions with 256-QAM are possible and at least one MCS index is kept for very robust data transmissions using QPSK.

In the following, exemplary embodiments are provided concerning the performing of the selection of the set of modulation and coding schemes from the predefined sets. It is noted that any of the following exemplary embodiments may be combined with any of the previously described embodiments.

According to an embodiment of the present disclosure, the choice of the set is performed by the network node, signaled to the terminal, and the selection of the set at the terminal is performed accordingly, wherein the signaling is a higher-layer signaling less frequent than the signaling of the modulation and coding scheme indicator.

In terms of LTE terminology, the MCS table is indicated by higher layer signaling. The indication of the set (MCS table) is carried out by either MAC or RRC messages which are sent in downlink direction (from the eNB to the UE, or alternatively from the eNB to the relay or from the relay to the UE). This approach yields a semi-static configuration of the used MCS table by means of higher layer information elements. The term semi-static implies that in comparison with the dynamic scheduling, allocation and MCS control, the MCS table selection is performed less frequently. The frequency may be selected according to the requirements—if the channel conditions change so that a change of the MCS table may be beneficial, then the new table is indicated. The data transmitting node thus chooses the MCS table, signals the choice by means of a set indicator to the data receiving node and the data receiving node selects then the set (MCS table) according to the received set indicator.

This embodiment provides an advantage of simple and robust implementation. The switching between four MCS tables would require only two additional bits in the higher-level signaling, the switching between two MCS tables (for example the standard Release-11 table as shown in FIG. 6 and the adapted table for 256-QAM) would require only one bit.

However, the present disclosure is not limited to signaling of the set selection indicator within the higher-layer signaling. Alternatively, in accordance with another embodiment of the present disclosure, the choice of the set is performed by the network node, signaled to the terminal, and the selection of the set at the terminal is performed accordingly, wherein the signaling is carried on the same layer as the signaling of the modulation and coding indicator, but less frequently.

In particular, in the context of the LTE, the indication may be advantageously conveyed by reusing code points of the DCI. This approach yields a dynamic MCS table adaptation that can be changed from subframe to subframe but does not necessarily have to be changed. In general, the set selection indication may be included within the scheduling information.

In LTE it can be expected that 256QAM would be mainly used for initial transmissions of a transport block. The reason is that if a first transmission with 256QAM fails, it is likely that the cause for the failure is imperfect channel estimation or the fading of the channel that has made the quality inferior. In both of these cases, it is beneficial to use a more robust modulation scheme for any retransmissions in order to decrease the probability of sustained decoding failures. This behavior could be exploited by tying the 256QAM extension to the MCS table to a first transmission of a transport block.

This may be performed based on the NDI indicator. The NDI indicator is an indicator for distinguishing between the first transmission of data and data retransmission. Accordingly, it is usually a one-bit flag. This is also the case in LTE.

In particular, the following interpretation of the signaling may be enabled or disabled by means of a semi-static configuration, for instance by a higher layer protocol such as RRC or MAC:

Upon detection of a toggled NDI, apply the 256-QAM version of the MCS table to the interpretation of the 5-bit MCS field whereas Upon detection of a non-toggled NDI, apply the Release-11 MCS table to the interpretation of the 5-bit MCS field Here, "toggled" means set to indicate new data, i.e., first transmission of the data. Correspondingly "non-toggled" means set to indicate retransmission of data.

However, it is noted that the interpretation may also be specified as mandatory and does not have to be controlled by the higher-level signaling. The control by the higher layer signaling provides an advantage of backward compatibility.

Generally formulated, the selection of the set of modulation and coding schemes is performed based on whether the data to be modulated/coded are data transmitted for the first time (new data) or a retransmission. This selection may be performed at the transmitter and the receiver in the same way, and in particular at the receiver based on the new data indicator. The above example is based on the observation that for the first transmission, the assumption of good channel conditions may be made and thus, the second set of modulation and coding schemes including the highest-order modulation may be used. If the transmission was not successful, so that a retransmission is necessary, this may indicate that the channel conditions are worse and thus, the first set is selected, which does not include the highest-order modulation.

However, the interpretation does not need to be based (only) on the NDI. Alternatively, or in addition, the redundancy version (RV) may be used for this purpose.

In particular, the following interpretation of the signaling could be enabled or disabled by means of a semi-static configuration, for instance by a higher layer protocol such as RRC or MAC:

Upon detection of RV=0, apply the 256-QAM version of the MCS table to the interpretation of the 5-bit MCS field.

Upon detection of RV=1/2/3, apply the Release 11 MCS table to the interpretation of the 5-bit MCS field.

It is to be noted that the above assignment of the values is only exemplary. Alternatively, other RV values could be used instead of 0 to indicate the use of 256-QAM. The 5-bit MCS field refers to the MCS table size of 32 entries as illustrated in FIG. 6 and to an advantageous embodiment of the present disclosure, according to which the first set is the current LTE table shown in FIG. 6 and the second set is a table with the same number of entries but including instead of some entries with lowest-order modulation new entries with a modulation, the order of which is higher than any modulation on the first set.

It is noted that the interpretation may also be specified as mandatory and does not have to be controlled by the higher-level signaling. The control by the higher layer signaling provides an advantage of backward compatibility.

Generally speaking, redundancy version indicator (may correspond to a field in a control information) specifies the version of redundancy to be applied when retransmitting data. Namely, hybrid ARQ schemes performs retransmissions by using different redundancy schemes in order to achieve higher diversity and better probability of correct decoding. Thus, the redundancy version is also an indication for the retransmitting and, in addition, for a number of retransmissions performed so far. Accordingly, this information may be also used for switching between the sets of modulation and coding schemes. Redundancy version 0 is used with no retransmissions and may thus advantageously be used to indicate selection of the second set of modulation and coding schemes, which includes the highest-order modulation (256-QAM). The remaining values of the RV may be used to select the first set without the highest-order modulation. Alternatively, the different redundancy version values may be used to select different sets (i.e., select between more than 2 MCS tables). The higher the number of retransmissions, the more robust set of modulation and coding schemes is selected preferably.

The above examples rely on explicit signaling of a set selection indicator. Another approach is the implicit MCS table indication.

In accordance with another embodiment of the present disclosure, the selection of the set is performed by both terminal and network node based on the terminal's channel conditions reported from the terminal to the network node. Accordingly, no exchange of an explicit indication is necessary in order to select the set of the modulation and coding schemes.

In the context of the LTE, the MCS table may be determined by the average channel quality of the UE that is captured by the wideband CQI which is reported from the UE to the eNB. This approach does not require any additional signaling and automatically adapts the MCS table to the prevailing channel conditions. It has to be specified, which wideband CQI values yield an MCS table switching so that the switching (selecting of an MCS table different from the currently employed MCS table) is performed in the same way at the transmitter and the receiver such as eNodeB and the UE (or other combination of relay, eNodeB and terminal).

Figure 17:
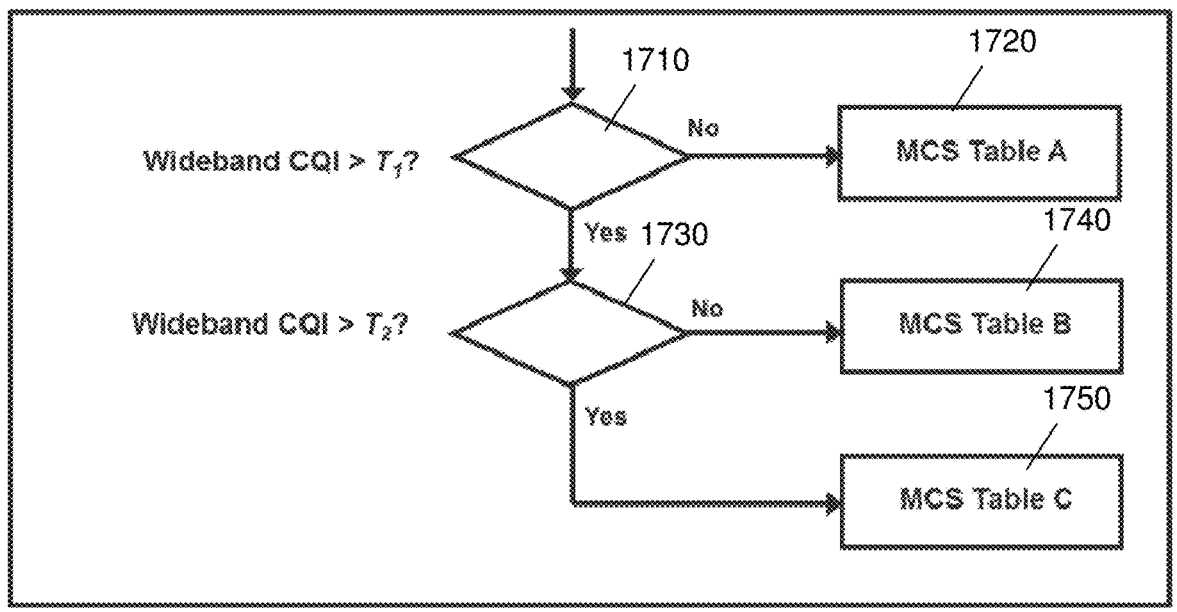
FIG. 17 is a flow diagram illustrating selection of the MCS table at the transmitter and/or receiver.

An exemplary MCS table selection strategy based on the reported wideband CQI is provided in FIG. 17. Accordingly, two CQI thresholds T1 and T2>T1 are defined in order to enable switching between different MCS tables. MCS Table A is used in case of bad channel conditions with low SINR levels, MCS Table B for medium SINR levels, and MCS Table C for high SINR levels.

The process starts by decision 1710 on whether a channel quality measure employed exceeds a first threshold, T1. If not, a first set of modulation and coding schemes is selected 1720 (MCS table A). If yes, it is further judged 1730 whether the channel quality measure exceeds a second threshold, T2. If this is not the case, then a second set (MCS table B) of modulation and coding schemes is selected 1740. If yes, a third set of modulation and coding schemes (MCS table C) is selected 1750. It is noted that this example is not meant to limit the present disclosure. Alternatively, a selection between two sets may be performed based on a single threshold. This would correspond to the steps 1730-1750 of FIG. 17 and selection between the MCS table B and C. Moreover, the decision may be performed for more than three sets (MCS tables) based on the corresponding number of thresholds (for P tables, P−1 thresholds).

In yet another embodiment, the usage of a particular MCS table is linked to a usage of a certain DCI format, i.e., of the control information, which contains also the (dynamic) scheduling information including the modulation and coding indicator. In terms of the LTE-embodiment, since DCI format 1A is used for robust data transmissions in general, it is not required to support 256-QAM for the corresponding data transmissions. Therefore, according to this embodiment, the standard Release-11 MCS table is used in combination with DCI format 1A. For the other DCI formats it can be indicated in semi-static or dynamic manner which MCS table is to be used. The downlink control information format including the DCI formats in LTE can be found, for instance, in the specification 3GPP TS 36.212 v. 11.1.0, Section 5.3.3 "Downlink Control Information" and, in particular in the subsection 5.3.3.1 "DCI formats", incorporated herein by reference.

In general, the scheduling information which includes the modulation and coding scheme is a part of control information (such as downlink control information). The control information can have different formats. According to this embodiment, each set of modulation and coding schemes is associated with a particular format (or more formats) of the control information unambiguously in such a way that based on the control information format, it can be decided, which set is to be select. For example, there is a first control information format associated with a first set and second control information associated with a second set. However, there may be more control information formats associated with each the first set and the second set.

Although the above description mainly refers to MSC tables for the downlink, the same concept can be analogously applied to the MCS table for the uplink.

Figure 18:
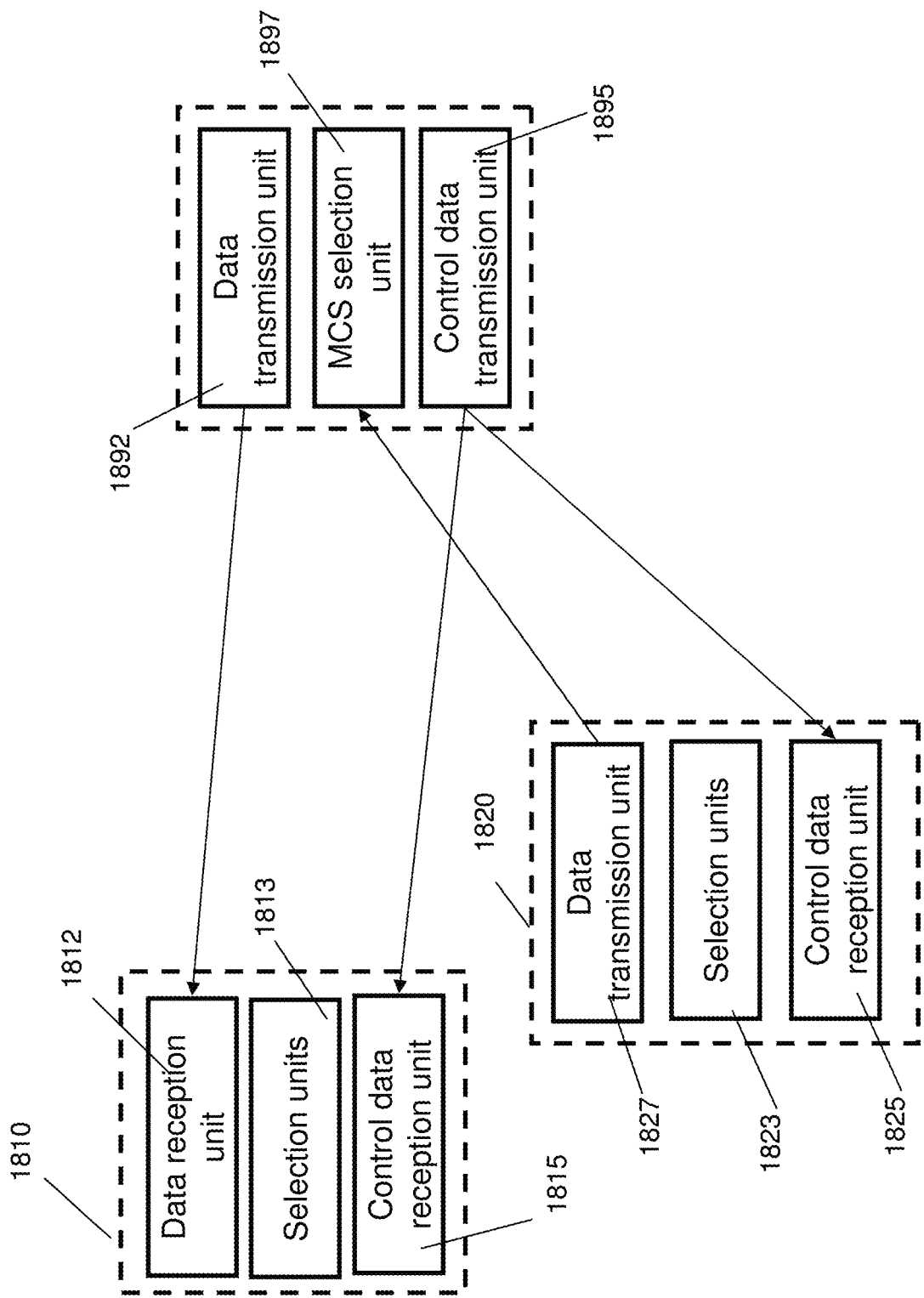
FIG. 18 is a block diagram illustrating the terminals and a network node and their structure.

FIG. 18 illustrates examples of devices in accordance with the present disclosure. In particular, FIG. 18 shows two terminals 1810 and 1820. The terminal 1810 is a terminal capable of transmitting data with a modulation and coding scheme indicated within the scheduling information, being a part of control information. Terminals 1810 and 1820 may use different sets of modulation and coding schemes since they may experience different channel conditions. Terminal 1810 works in downlink, terminal 1820 in uplink in this example. A single terminal may be provided capable of applying bundling in both uplink and downlink direction. Such a terminal would then include the functional blocks of both terminals 1810 and 1820. FIG. 18 further shows a scheduling node 1890. The scheduling node 1890 schedules the transmission and reception of data by the terminals. The scheduling node may be a network node such as a base station or a radio network controller or the like and in particular an eNodeB. For instance, in LTE the eNodeB performs the dynamic scheduling for the shared channels in downlink (PDSCH) and in uplink (PUSCH). However, it is noted that in general, in LTE or other systems the scheduling may be performed by a different node or for other downlink or uplink channels, which is still no problem for the employment of the present disclosure in such a system.

In accordance with an embodiment of the present disclosure, a terminal 1820 is provided for transmitting data in a multicarrier communication system in which the transmission of data is performed in transmission time intervals. The terminal 1820 includes a control information reception unit 1825 for receiving scheduling information indicating resources on which the terminal is scheduled to transmit data, and including a set of modulation and coding indicators for indicating the modulation scheme and the size of the data according to which data is to be transmitted. Moreover, the terminal comprises a data transmission unit 1827 for transmitting the data in the scheduled resources and in accordance with the received modulation and coding indicator and according to a transmission parameter of the data to be transmitted. In particular the transmission parameter may be used for selecting the modulation and coding scheme to be used for coding data to be transmitted.

In accordance with another embodiment of the present disclosure, a terminal 1810 is provided for receiving data in a multicarrier communication system, in which the reception of data is performed in transmission time intervals. Such a terminal 1810, similarly to the terminal 1820, for receiving scheduling information indicating resources on which the terminal is scheduled to transmit data, and including a set of modulation and coding indicators for indicating the modulation scheme and the size of the data according to which data is to be transmitted. Moreover, the terminal comprises a data transmission unit 1827 for transmitting the data in the scheduled resources and in accordance with the received modulation and coding indicator and according to a transmission parameter of the data to be transmitted. In particular the transmission parameter may be used for selecting the modulation and coding scheme to be used for coding data to be transmitted.

The transmission parameter may be for instance the transmission power at which the data are transmitted. Alternatively, the transmission parameter may be linking information capable of linking a particular subframe set to a corresponding modulation and coding scheme indicator.

The modulation and coding indicator set, for instance one or more of MCS tables, may be included in the scheduling information. The modulation order field and the TBS index may be a separate field or bit within a modulation and coding indicator. Alternatively, the modulation order field and the TBS index may be implemented as a single field.

The modulation and coding indicator may be semi-statically chosen among the received modulation and coding indicator set by comparing, at a selection unit 1813 or 1823 the power level at which the data are to be received or transmitted. This can be done according to the steps described with reference to FIG. 17. However this is not to limit the present disclosure. In particular, the selection unit 1813 or 1823 may select the modulation and coding scheme set according to a signaled set selection indication and the modulation and coding scheme therefrom based on the modulation and coding indicator. Alternatively, the comparison may be performed at the reception unit 1815 or 1825. The selection unit 1813 or 1823 may include the above described modulation and coding selection unit and the set selection unit. In addition or alternatively the reception unit 1815 or 1825 may further be adapted to select the appropriate modulation and coding indicator according to one of the methods of the present disclosure.

Alternatively, the modulation and coding indicator may be signaled to the terminal 1810 or 1820 by a semi-static configuration, such as a RRC or MAC configuration. In particular, the appropriate MCS table to be used can be directly indicated by the eNB. However, this is not to limit the present disclosure. In alternative embodiments the linking indicator does not have to be necessarily configured by the RRC. Any other type of signaling may be used. The term semi-statically here refers to the fact that the signaled value applies for more than one scheduled transmission and or reception.

The terminal may be a mobile or a static terminal. However, the terminal may also be a normal user terminal or a relay node. The multicarrier communication system may be a wireless communication system supporting orthogonal frequency division modulation (OFDM), such as LTE. However, the present disclosure is not limited thereto and modulation and coding scheme of the present disclosure may be applied to any communication system supporting dynamic scheduling on a shared data or control channel. The transmission time interval here refers to a predefined processing time interval in which the data are provided to the physical layer for transmission in a subframe (predefined duration on a radio interface). For instance, the length of the TTI in LTE is one millisecond and one TTI is mapped on the physical resources of one subframe as already described in the background section. It is noted that these values apply for the current LTE specifications. However, the present disclosure is applicable for any timing of the radio interface.

Figure 19:
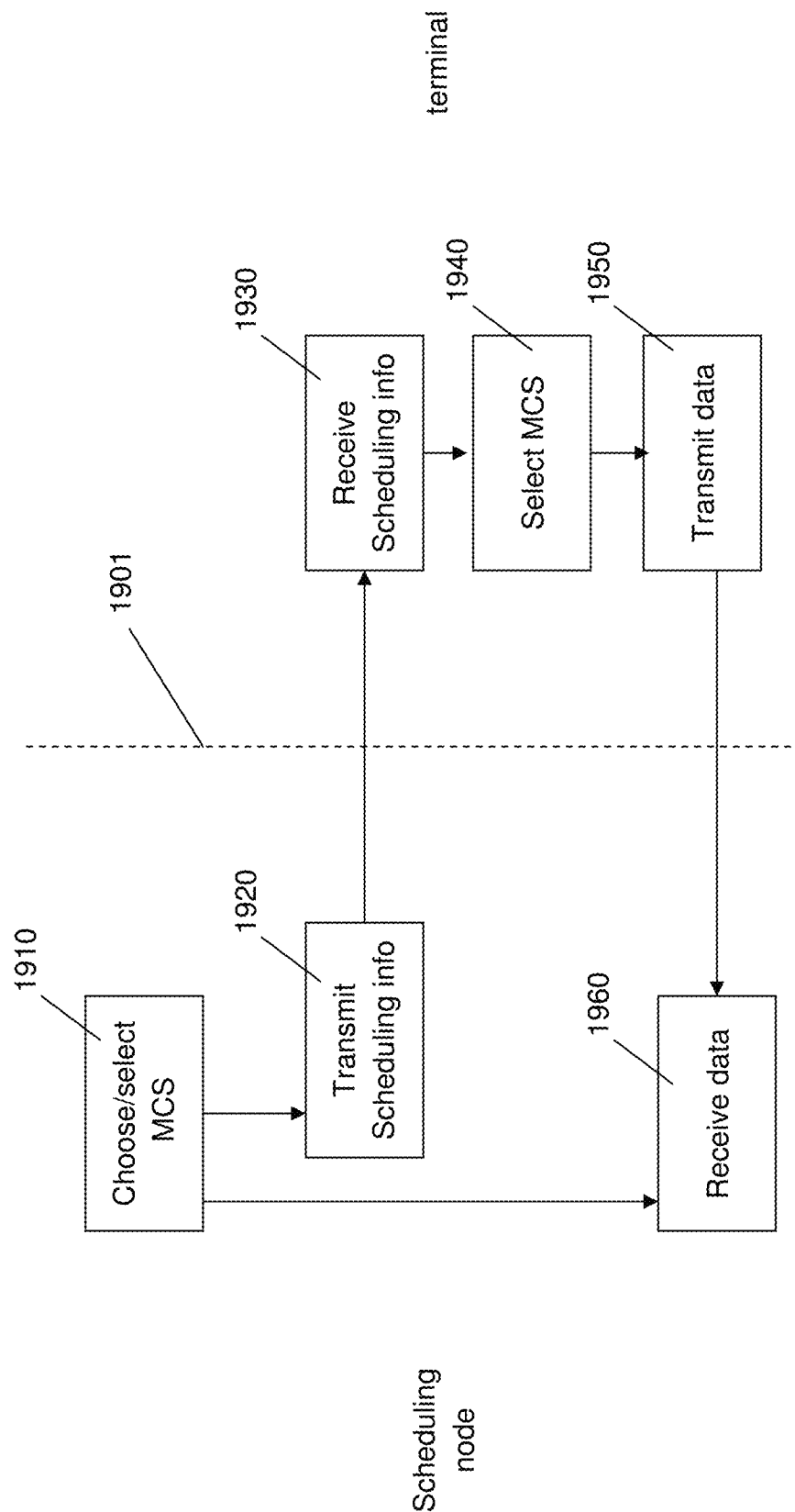
FIG. 19 is a flow diagram illustrating a method for selecting and applying the selected modulation and coding scheme.

The present disclosure further provides methods for transmission and reception of data. One of such methods is illustrated in FIG. 19.

In particular, a method is provided for transmitting and/or receiving data in a multicarrier communications system, transmission and/or reception of data being performed in transmission time intervals. The method is to be performed at a scheduling node and comprises transmitting 1920 scheduling information, which indicates resources on which a terminal is scheduled to transmit or receive data and including scheduling information indicating resources on which the terminal is scheduled to transmit data, and including a set of modulation and coding indicators for indicating the modulation scheme and possibly the set selection indicator and the size of the data according to which data is to be transmitted. The method further includes transmitting 1280 and/or receiving 1960 the data in the scheduled resources (over a channel 1901) to/from the terminal in accordance with the transmitted modulation and coding indicator and on a transmission parameter of the data to be transmitted/received 1910, 1915. It is noted that FIG. 19 shows a step of configuring 1910, 1915 the terminal transmission or reception of data (corresponding to configuring the scheduling node own reception and transmission of data respectively). This step may be a part of scheduling performed by the scheduling node and may include selection of the resources and judging which modulation and order indicator has to be chosen among the set of modulation and coding indicators as well as the selection of the set of modulations and coding schemes. The configuration step provides a result (configuration) to the terminal via transmission. On the other hand, the scheduling node also handles according to this configuration 1960, 1980, i.e., transmits or receives data in the configured resources.

Although in the embodiments considered above the MCS tables have been described with reference to subframes. It has to be understood that the concepts above and the principles of the disclosure can be also applied to subbands. In particular, it has to be understood that several MCS tables, for instance adapted to take into account varying transmission powers, could be designed and associated to different corresponding subbands.

Moreover, the principles described above can be applied to any communication system, such as multicarrier communication systems.

The explanations given in the Technical Background section above are intended to better understand the specific exemplary embodiments described herein and should not be understood as limiting the disclosure to the described specific implementations of processes and functions in the mobile communication network such as a network compliant with the 3GPP standards. Nevertheless, the improvements proposed herein may be readily applied in the architectures/systems described in the Technological Background section and may in some embodiments of the disclosure also make use of standard and improved procedures of theses architectures/systems. It would be appreciated by a person skilled in the art that numerous variations and/or modifications may be made to the present disclosure as shown in the specific embodiments without departing from the spirit or scope of the disclosure as broadly described.

Another embodiment of the disclosure relates to the implementation of the above described various embodiments using hardware and software. It is recognized that the various embodiments of the disclosure may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the disclosure may also be performed or embodied by a combination of these devices.

Further, the various embodiments of the disclosure may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Summarizing, the present disclosure relates to adaptive modulation and coding scheme selection and signaling in a communication system. In particular, a modulation and coding scheme to be used for transmission of a data is selected from a set of predetermined modulation and coding schemes. The predetermination of the set is performed by selecting the set from a plurality of predefined sets. The sets have the same size, so that a modulation and coding selection indicator signaled to select the modulation and coding scheme may be advantageously applied to any of the selected sets. Moreover, a second set includes schemes with a modulation not covered by the schemes of a first set, and which is of a higher order than any modulation in the first set.

The invention claimed is:

1. A communication apparatus, comprising:
   a receiver which, in operation, receives, from a base station in a communication system, scheduling information specifying resources on which the communication apparatus is to receive data from the base station, a modulation and coding indicator, and set selection information; and
   circuitry, which is coupled to the receiver and which, in operation,
      selects one set out of at least two sets of modulation and coding schemes based on the received set selection information, wherein the at least two sets include a first set and a second set, the first set and the second set have a plurality of modulation and coding schemes in common and differ in that the second set includes an additional modulation with an order higher than any modulation in the first set, the additional modulation includes only a 256-QAM modulation, the first set supports 27 levels of transport block size (TBS) indices that are incremented by 1 and the second set supports more than 27 levels of TBS indices of which a subset is not contiguous, and at least two lowest modulation and coding indicators correspond to lowest TBS indices in the first set and to lowest TBS indices in the second set, respectively, and correspond to the same lowest modulation in the first set and in the second set; and
      selects one modulation and coding scheme from the selected set based on the received modulation and coding indicator,
   wherein the receiver, in operation, receives the data from the base station on the scheduled resources using the selected modulation and coding scheme.

2. The communication apparatus according to claim 1, wherein the set selection information is signaled by higher layer signaling.

3. The communication apparatus according to claim 1, wherein the scheduling information and the modulation and coding indicator are transmitted on a Physical Downlink Control Channel (PDCCH).

4. The communication apparatus according to claim 1, wherein the TBS indices are size indicators each indicating at least one of: (i) the number of bits in a transport block which is to be mapped onto physical resources, and (ii) retransmission without specific indication of the transport block size.

5. A method performed by a communication apparatus, the method comprising:

receiving, from a base station in a communication system, scheduling information specifying resources on which the communication apparatus is to receive data from the base station, a modulation and coding indicator, and set selection information;

selecting one set out of at least two sets of modulation and coding schemes based on the received set selection information, wherein the at least two sets include a first set and a second set, the first set and the second set have a plurality of modulation and coding schemes in common and differ in that the second set includes an additional modulation with an order higher than any modulation in the first set, the additional modulation includes only a 256-QAM modulation, the first set supports 27 levels of transport block size (TBS) indices that are incremented by 1 and the second set supports more than 27 levels of TBS indices of which a subset is not contiguous, and at least two lowest modulation and coding indicators correspond to lowest TBS indices in the first set and to lowest TBS indices in the second set, respectively, and correspond to the same lowest modulation in the first set and in the second set;

selecting one modulation and coding scheme from the selected set based on the received modulation and coding indicator; and receiving the data from the base station on the scheduled resources using the selected modulation and coding scheme.

6. The method according to claim 5, wherein the set selection information is signaled by higher layer signaling.

7. The method according to claim 5, wherein the scheduling information and the modulation and coding indicator are transmitted on a Physical Downlink Control Channel (PDCCH).

8. The method according to claim 5, wherein the TBS indices are size indicators each indicating at least one of: (i) the number of bits in a transport block which is to be mapped onto physical resources, and (ii) retransmission without specific indication of the transport block size.

* * * * *